(12) United States Patent
Hayashi et al.

(10) Patent No.: US 9,796,354 B1
(45) Date of Patent: Oct. 24, 2017

(54) AIRBAG DEVICE FOR FRONT PASSENGER SEAT

(71) Applicant: TOYODA GOSEI CO., LTD., Kiyosu-shi, Aichi-ken (JP)

(72) Inventors: Takeki Hayashi, Kiyosu (JP); Tsuyoshi Furuno, Kiyosu (JP); Junichi Asanuma, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 15/461,780

(22) Filed: Mar. 17, 2017

(30) Foreign Application Priority Data

Mar. 30, 2016 (JP) .................................. 2016-68881

(51) Int. Cl.
| | |
|---|---|
| *B60R 21/233* | (2006.01) |
| *B60R 21/203* | (2006.01) |
| *B60R 21/205* | (2011.01) |
| *B60R 21/2338* | (2011.01) |
| *B60R 21/235* | (2006.01) |
| *B60R 21/239* | (2006.01) |
| *B60R 21/237* | (2006.01) |
| *B60R 21/276* | (2006.01) |

(Continued)

(52) U.S. Cl.
CPC .......... *B60R 21/233* (2013.01); *B60R 21/203* (2013.01); *B60R 21/205* (2013.01); *B60R 21/235* (2013.01); *B60R 21/237* (2013.01); *B60R 21/239* (2013.01); *B60R 21/2338* (2013.01); *B60R 21/276* (2013.01); *B60R 2021/0004* (2013.01); *B60R 2021/23107* (2013.01); *B60R 2021/23332* (2013.01); *B60R 2021/23382* (2013.01); *B60R 2021/23509* (2013.01); *B60R 2021/23542* (2013.01); *B60R 2021/23576* (2013.01)

(58) Field of Classification Search
CPC . B60R 21/233; B60R 21/205; B60R 21/2338; B60R 2021/23382
USPC ............................................. 280/729, 743.2
See application file for complete search history.

(56) References Cited

U.S. PATENT DOCUMENTS

| | | | |
|---|---|---|---|
| 4,262,931 A | 4/1981 | Strasser et al. | |
| 9,187,055 B1 * | 11/2015 | Genthikatti | ......... B60R 21/2338 |

(Continued)

FOREIGN PATENT DOCUMENTS

| | | |
|---|---|---|
| JP | H06-72276 A | 3/1994 |
| JP | H08-324373 A | 12/1996 |
| JP | 2010-201980 A | 9/2010 |

*Primary Examiner* — Faye M Fleming
(74) *Attorney, Agent, or Firm* — Posz Law Group, PLC

(57) ABSTRACT

An airbag includes a main bag section and a center bag section deployable to protrude towards a vehicle interior out of an inboard side of the main bag section. An inboard-side member, which forms the inboard side of the main bag section, is composed of a front component and a rear component. The center bag section includes a front wall and a rear wall. The front wall is composed of a rear extended region of the front component which is disposed in such a manner as to protrude rearward out of the rear edge of the front component. The rear wall is composed of a front extended region of the rear component which protrudes forward out of the front edge of the rear component and has a generally identical outer contour to the rear extended region. The center bag section is formed by jointing outer edges of the front and rear extended regions.

8 Claims, 14 Drawing Sheets

(51) Int. Cl.
    *B60R 21/231*    (2011.01)
    *B60R 21/00*     (2006.01)

(56) References Cited

U.S. PATENT DOCUMENTS

| | | |
|---|---|---|
| 2015/0258958 A1   | 9/2015  | Belwafa et al. |
| 2015/0343986 A1*  | 12/2015 | Schneider ............. B60R 21/205 |
| | | 280/729 |
| 2016/0046254 A1*  | 2/2016  | Yamada ................ B60R 21/233 |
| | | 280/729 |
| 2016/0046257 A1*  | 2/2016  | Yamada .............. B60R 21/2338 |
| | | 280/729 |
| 2016/0207490 A1*  | 7/2016  | Yamada .............. B60R 21/2338 |
| 2017/0129444 A1*  | 5/2017  | Fukawatase .......... B60R 21/233 |

* cited by examiner

AIRBAG DEVICE FOR FRONT PASSENGER SEAT

CROSS REFERENCE TO RELATED APPLICATIONS

The present application claims priority from Japanese Patent Application No. 2016-068881 of Hayashi et al., filed on Mar. 30, 2016, the entire disclosure of which is incorporated herein by reference.

BACKGROUND OF THE INVENTION

1. Field of the Invention

The present invention relates to an airbag device for a front passenger seat mountable on an instrument panel in front of a front passenger seat and provided with an airbag which is stored in a housing disposed inside the instrument panel in a folded-up configuration.

2. Description of Related Art

JP H06-72276 A discloses a known airbag device which is mountable on a vehicle having a center-front seat in addition to a right-front seat. The airbag of the airbag device is stored inside the instrument panel in front of the right-front seat in a folded-up configuration and is configured to be deployed not only towards the right-front seat but also towards the driver's seat for covering an area spanning the front of the right-front seat and the front of the center-front seat.

However, since the above airbag is formed into one bag having a sufficient width in a left and right direction for protecting both a right-front seat passenger and a center-front seat passenger, it has a big volume and will require a high-power inflator, and such a big airbag is likely to make a whole airbag device bulky. Therefore, the above airbag device has a room for improvement in the light of reduction of manufacturing cost, and compact and lightweight design.

US 2015/0258958 A discloses an airbag device for a front passenger seat provided with an airbag which includes a main bag section deployable in front of the front passenger seat and a center bag section which is disposed on a side of the main bag section facing towards the driver's seat and deployable in such a manner as to protrude partially towards the driver's seat.

In the above airbag, although the center bag section has an independent bag construction separated from the main bag section, it is jointed with the main bag section only at a periphery of a communication hole which provides gas communication between the main bag section and the center bag section. This configuration is not simple, and moreover, may cause an undesirable scenario that the center bag section fails to be supported by the main bag section smoothly and fails to protect a passenger adequately at airbag deployment. In order to catch the passenger smoothly, the center bag section will need to be increased in volume, but this is not preferable, either.

SUMMARY OF THE INVENTION

An object of the present invention is to provide an airbag device for a front passenger seat which is capable of catching a vehicle passenger with a center bag section of an airbag steadily, without an increase in volume of the airbag and with a simple configuration.

The object of the invention will be achieved by a following airbag device for a front passenger seat:

The airbag device is adapted to be mounted on an instrument panel in front of a front passenger seat of a vehicle, and includes a housing adapted to be disposed in the instrument panel and an airbag housed in the housing in a folded-up configuration.

The airbag includes a main bag section deployable in front of the front passenger seat and a center bag section which is disposed on an inboard-side region of the main bag section and protrudes towards a vehicle interior out of a portion of the inboard-side region at airbag deployment. The center bag section includes a front wall region which is deployable to face a front of the vehicle and a rear wall region which is deployable to face a rear of the vehicle.

An inboard side member for forming at least the inboard-side region of the main bag section is composed of a front component that forms a front part of the inboard-side member and a rear component which is provided separate from the front component and forms a rear part of the inboard-side member. The front component includes a rear extended region which protrudes rearward out of a region in a vicinity of the rear edge of the front component. The rear component includes a front extended region which protrudes forward out of a region in a vicinity of the front edge of the rear component and has a generally identical outer contour to the rear extended region of the front component. The center bag section is formed by jointing outer circumferential edges of the rear extended region and front extended region. The rear extended region of the front component forms the front wall region of the center bag section, while the front extended region of the rear component forms the rear wall region of the center bag section.

In the airbag device for a front passenger seat of the invention, the center bag section is configured to protrude out of a portion of the main bag section. The center bag section is formed by jointing the outer circumferential edges of the rear extended region and front extended region of the front component and rear component of the inboard-side member. That is, the region of the main bag section surrounding the center bag section (i.e., the inboard-side region of the main bag section) is composed of two originally separate members, i.e., the front component and rear component, and the center bag section is formed by jointing the outer circumferential edges of the rear extended region and front extended region formed on the front component and rear component. This simple configuration will contribute to reduction of manufacturing time and costs. In other words, the front wall region and rear wall region of the center bag section are continuous with an inboard-side wall of the main bag section. This configuration will help generate a great tension force on outer surfaces of the front wall region and rear wall region of the center bag section when the center bag section gains a high internal pressure due to an inflation gas upon airbag deployment. Therefore, in spite of its limited volume, the center bag section has a good shape retention property when inflated and deployed, thus will catch a passenger smoothly without being tumbled forward by the passenger.

Therefore, the airbag device for a front passenger seat of the invention will be capable of catching a passenger steadily with the center bag section of the airbag without increasing a volume of the airbag unduly and with a simple configuration.

In the airbag device for a front passenger seat of the invention, it is desired that:

the front component of the main bag section includes: a rear upper edge and a rear lower edge which extend generally along an up and down direction and form the rear edge of the front component above and underneath the rear extended region; and a rear upper curving region and a rear lower curving region which are disposed between the outer circumferential edge of the rear extended region and the rear upper edge and the rear lower edge and join the outer circumferential edge of the rear extended region with the rear upper edge and the rear lower edge gently in a curving fashion;

the rear component of the main bag section includes: a front upper edge and a front lower edge which are formed to correspond to the rear upper edge and the rear lower edge and form the front edge of the rear component above and underneath the front extended region; and a front upper curving region and a front lower curving region which are disposed between the outer circumferential edge of the front extended region and the front upper edge and the front lower edge and formed to correspond in curved shape to the rear upper curving region and rear lower curving region; and an area of the inboard-side region of the main bag section and the center bag section are formed by jointing together the rear upper edge and the front upper edge, the rear upper curving region and the front upper curving region, the outer circumferential edges of the rear extended region and the front extended region, the rear lower curving region and the front lower curving region, and the rear lower edge and the front lower edge.

With this configuration, at airbag deployment, a root end region of the center bag section, where the center bag section communicates with the main bag section, is formed into a generally truncated cone gently continuing from the main bag section. That is, in the airbag device of the invention, there is formed no partial dented region between the center bag section and the main bag section at airbag deployment. This configuration will further prevent the center bag section from bending forward at the root end region with respect to the main bag section when catching the passenger, and help catch the passenger in a further adequate fashion.

In the above airbag device, the airbag desirably further includes a mounting region that is disposed in the main bag section and by which the airbag is mounted on the housing, and a tether that joints a leading end of the center bag section as deployed and the mounting region inside the airbag for preventing an undue protrusion of the center bag section towards the vehicle interior. Such a tether will prevent the center bag section from protruding towards the vehicle interior in an undue fashion in an initial stage of airbag deployment, and help inflate and deploy the main bag section and center bag section quickly without causing an undue oscillation.

If the airbag further internally includes a regulating tether that regulates a clearance in a front and rear direction of a vicinity of a communicating region between the main bag section and center bag section, the communicating region will be prevented from being enlarged unduly in a front and rear direction at airbag deployment, and therefore, not only the center bag section but also a whole airbag including the main bag section will be deployed in a steady contour quickly.

If an attention is focused on the configuration in which the regulating tether can be used to regulate the clearance in a front and rear direction of the vicinity of the communicating region between the main bag section and center bag section for steadying the contour of the region in the vicinity of the communicating region at deployment and quickly and steadily inflating the center bag section, an airbag device for a front passenger seat may be configured such that an airbag includes:

a main bag section that is deployable in front of the front passenger seat and includes an inboard-side region deployable to face a vehicle interior;

a center bag section that is disposed on the inboard-side region of the main bag section and deployable in such a manner as to protrude towards the vehicle interior out of a portion of the inboard-side region of the main bag section;

a communicating region that provides gas communication between the main bag section and the center bag section; and a regulating tether that is disposed inside the airbag and regulates a clearance in a front and rear direction of a vicinity of the communicating region, a front edge region of the regulating tether being jointed to a front area of a periphery of the communicating region and a rear edge region of the regulating tether being jointed to a rear area of the periphery of the communicating region.

If the airbag device is configured like this, an inboard-side member for forming at least the inboard-side region of the main bag section may be composed of a front component which forms a front part of the inboard-side region and a rear component which is provided separate from the front component and forms a rear part of the inboard-side region. In this instance, moreover, it will be possible to provide a base material of the center bag section integrally in either the front component or rear component.

Alternatively, the airbag may be configured such that:

the front component includes a rear extended region which protrudes rearward out of a region in a vicinity of the rear edge of the front component;

the rear component includes a front extended region which protrudes forward out of a region in a vicinity of the front edge of the rear component and has a generally identical outer contour to the rear extended region of the front component; and the center bag section is formed by jointing outer circumferential edges of the rear extended region and the front extended region together.

This configuration will facilitate the production of the center bag section since the center bag section can be formed by jointing the outer circumferential edges of the rear extended region and the front extended region together when forming the inboard-side wall of the main bag section. Further, this configuration provides, in the center bag section, the front wall region and rear wall region which deployable to face each other, and the front wall region and rear wall region are each continuous with the inboard-side wall of the main bag section. This configuration will help generate a great tension force on the outer surfaces of the front wall region and rear wall region of the center bag section when the center bag section gains a high internal pressure due to an inflation gas upon airbag deployment. Therefore, in spite of its limited volume, the center bag section will have a good shape retention property when inflated and deployed, thus will catch a passenger smoothly without being tumbled forward by the passenger.

Moreover, the airbag device of the invention can also be configured to be mounted in front of a driver's seat of an automated-driving vehicle or the like for protecting the driver, such that an airbag protrudes out of a housing mounted on a steering wheel, by way of example. In that instance, the airbag should be configured to include:

a main bag section that is deployable in front of the driver's seat;

a sub bag section that is deployable in such a manner as to protrude out of a portion of a side of the main bag section;

a communicating region that provides gas communication between the main bag section and the sub bag section; and a regulating tether that is disposed inside the airbag and regulates a clearance in a front and rear direction of a vicinity of the communicating region.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
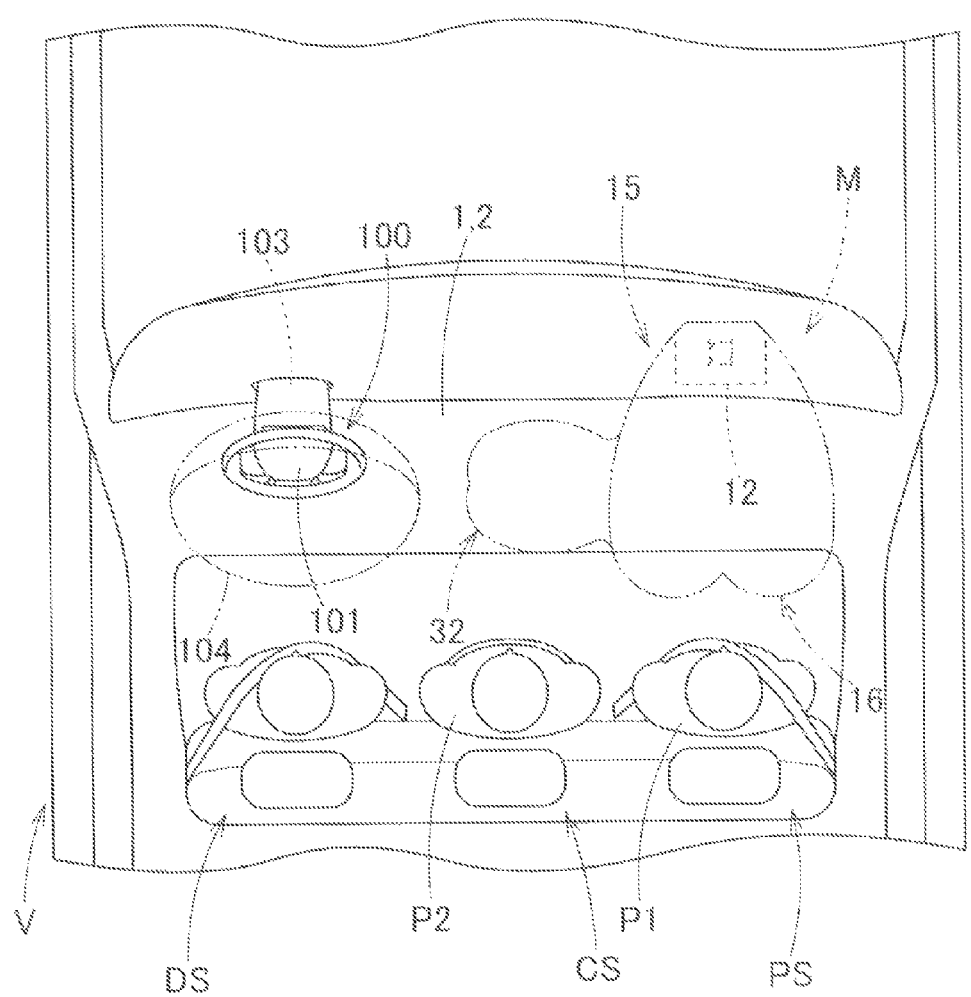
FIG. 1 is a schematic partial enlarged plan view of a vehicle on which an airbag device for a front passenger seat embodying the invention is mounted.
Figure 13:
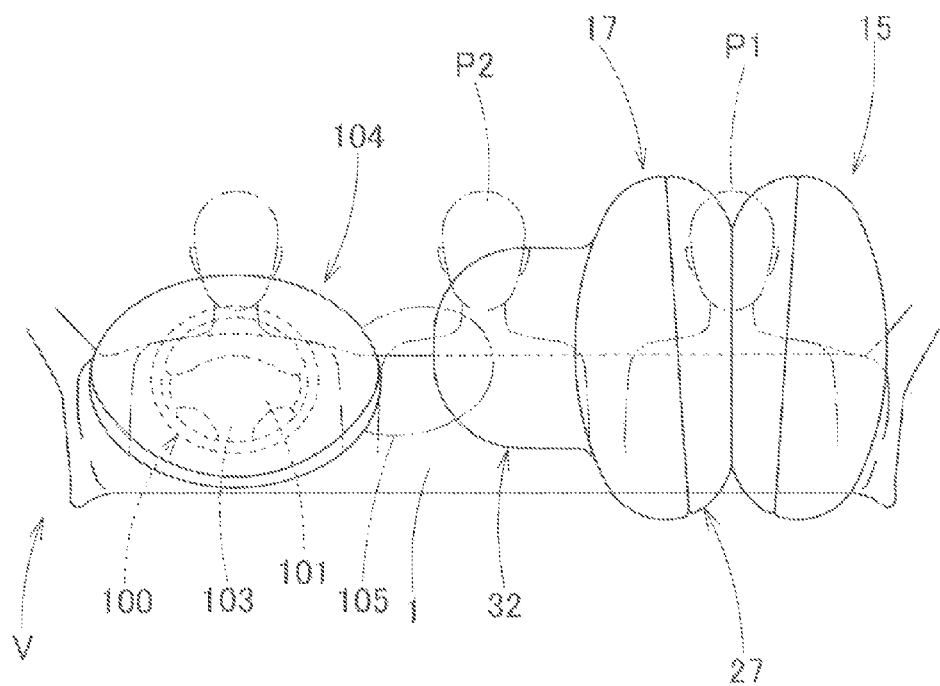
FIG. 13 is a front elevation of the airbag device for a front passenger seat as the airbag is deployed.

FIGS. 1 and 13 depict an airbag device M for a front passenger seat embodying the invention, as mounted on a left-hand drive vehicle V in which the driver's seat DS is located at the left side and a center seat CS is disposed between the normal front passenger seat PS and driver's seat DS for a passenger (center passenger) P2 to sit in. The airbag device M is mounted in front of the front passenger seat PS. The airbag device M of the illustrated embodiment is a top mount airbag device which is mounted underneath the top plane 2 of the instrument panel or dashboard 1. Unless otherwise specified, front/rear, up/down and left/right directions in this specification are intended to refer to front/rear, up/down and left/right directions of the vehicle V.

Figure 2:
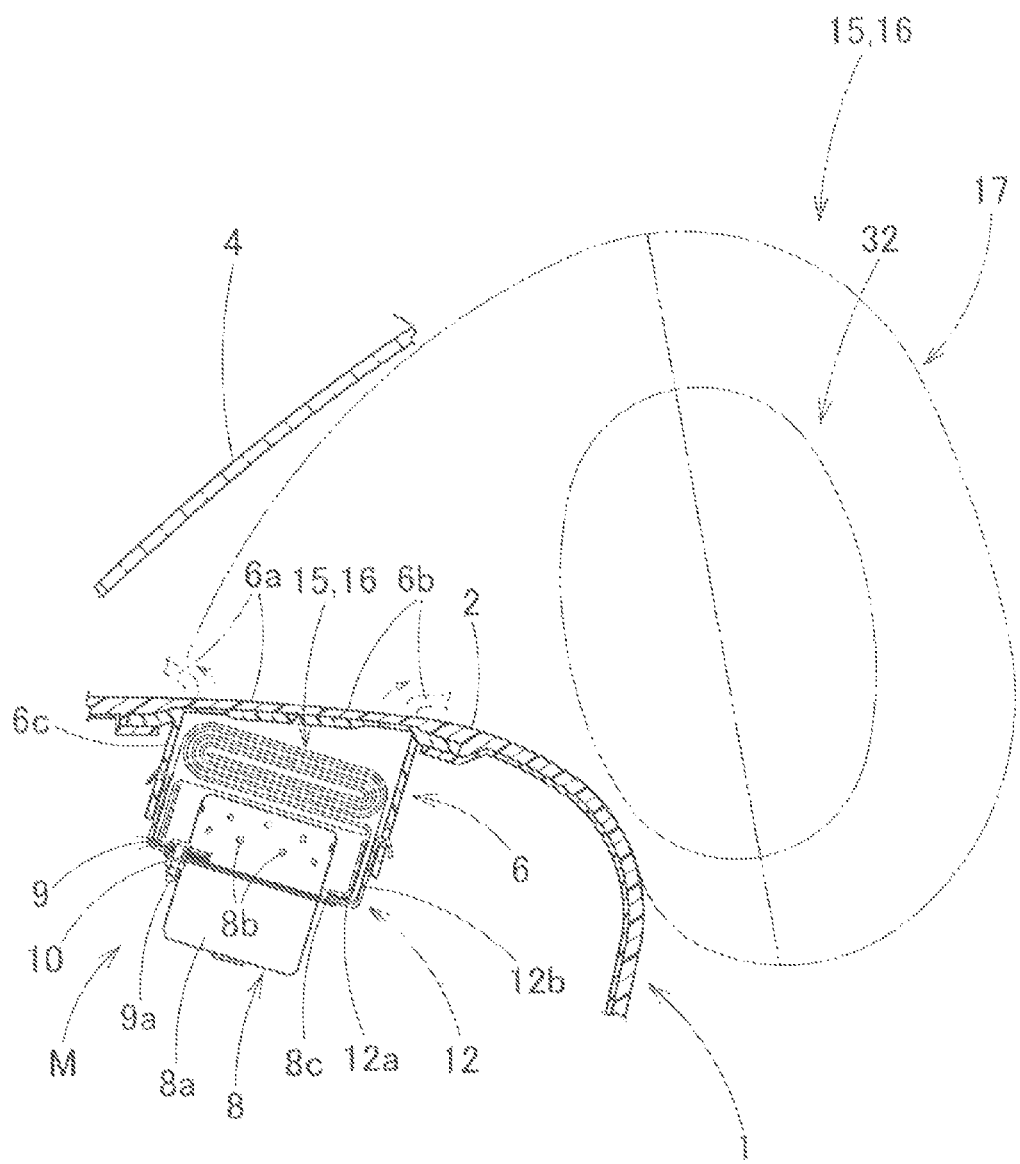
FIG. 2 is a schematic vertical section of the airbag device of the embodiment as mounted on board.

As shown in FIG. 2, the airbag device M includes an airbag 15, which is folded up, an inflator 8 for supplying the airbag 15 with an inflation gas, a case or housing 12 for housing and holding the airbag 15 and inflator 8, a retainer 9 for attaching the airbag 15 and inflator 8 to the case 12, and an airbag cover 6 for covering the airbag 15.

The airbag cover 6 is formed integrally with the instrument panel 1 fabricated of synthetic resin and includes two doors 6a and 6b which are openable forward and rearward when pushed by the airbag 15 upon airbag deployment. The airbag cover 6 further includes around the doors 6a and 6b a joint wall 6c to be jointed with the case 12.

As shown in FIG. 2, the inflator 8 includes a main body 8a having a generally pot-like contour and a flange 8c used to mount the inflator 8 on the case 12. The main body 8a is radially provided with numerous gas discharge ports 8b. The inflator 8 is configured to be actuated in the event of a frontal collision of the vehicle V.

The case 12 is made of sheet metal into a generally rectangular parallelepiped opening upward, and includes a generally rectangular bottom wall 12a and a circumferential wall 12b extending upward from an outer edge of the bottom wall 12a for joint with the joint wall 6c of the airbag cover 6, as shown in FIG. 2. The airbag 15 and inflator 8 are mounted on the bottom wall 12a of the case 12 with the aid of the retainer 9. The retainer 9 is disposed inside the airbag 15 such that the bolts 9a of the retainer 9 penetrate a peripheral region 22 of the gas inlet port 21 of the airbag 15, the bottom wall 12a of the case 12 and the flange 8c of the inflator 8, and the bolts 9a are fastened with nuts 10. The bottom wall 12a of the case 12 is provided with a not-shown bracket to be jointed to the body structure of the vehicle V.

As shown in FIGS. 3 to 9, the airbag 15 of the illustrated embodiment includes a bag body 16 which is inflatable with an inflation gas, a redirecting cloth 38 disposed inside the bag body 16 for controlling the flow of the inflation gas inside the bag body 16 and a plurality of tethers 45, 50, 52, 56 and 60 disposed inside the bag body 16 for regulating the contour of the bag body 16 at deployment.

The bag body 16 is formed of a flexible sheet member, and includes a main bag section 17 and a center bag section 32 which is configured to protrude towards a vehicle interior (i.e., towards the left, in the illustrated embodiment) out of a portion of an inboard side (i.e., the left side) 17a of the main bag section 17 at airbag deployment, as shown in FIGS. 3 to 6.

Figure 14:
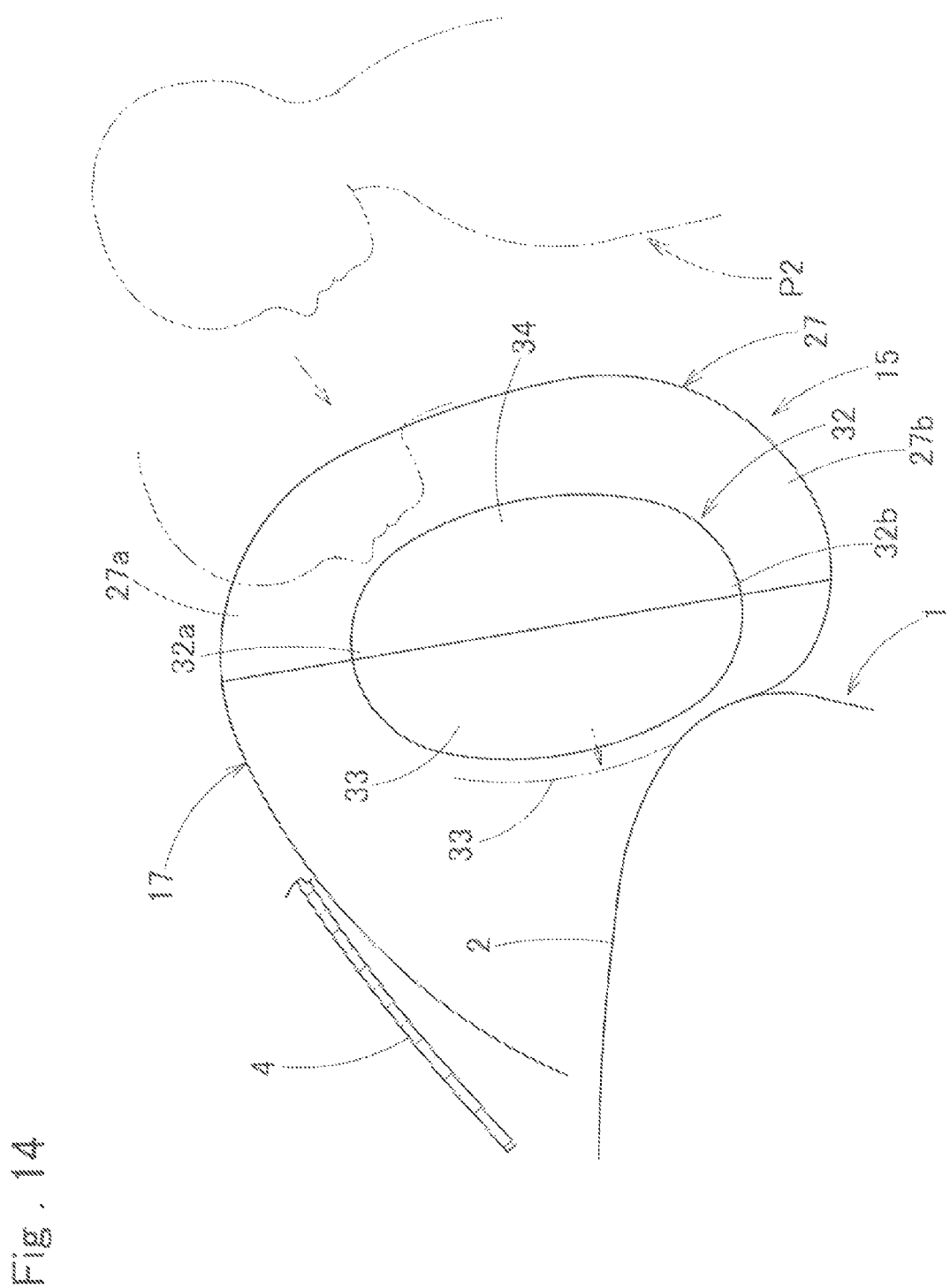
FIG. 14 is a left side view of the airbag device as the airbag is deployed.

The main bag section 17 is deployable in front of the front passenger seat PS in such a manner as to fill up a space between the top plane 2 of the dashboard 1 and the windshield 4, as shown in FIGS. 2 and 14. More specifically, the main bag section 17 is deployable into a generally square cone whose top is located at the front end. The main bag section 17 includes a rear wall 27 deployable in such a manner as to face rearward, towards the front passenger seat PS, and a circumferential wall 18 extending forward from an outer edge of the rear wall 27 while narrowing and converging at the front end.

Figure 3:
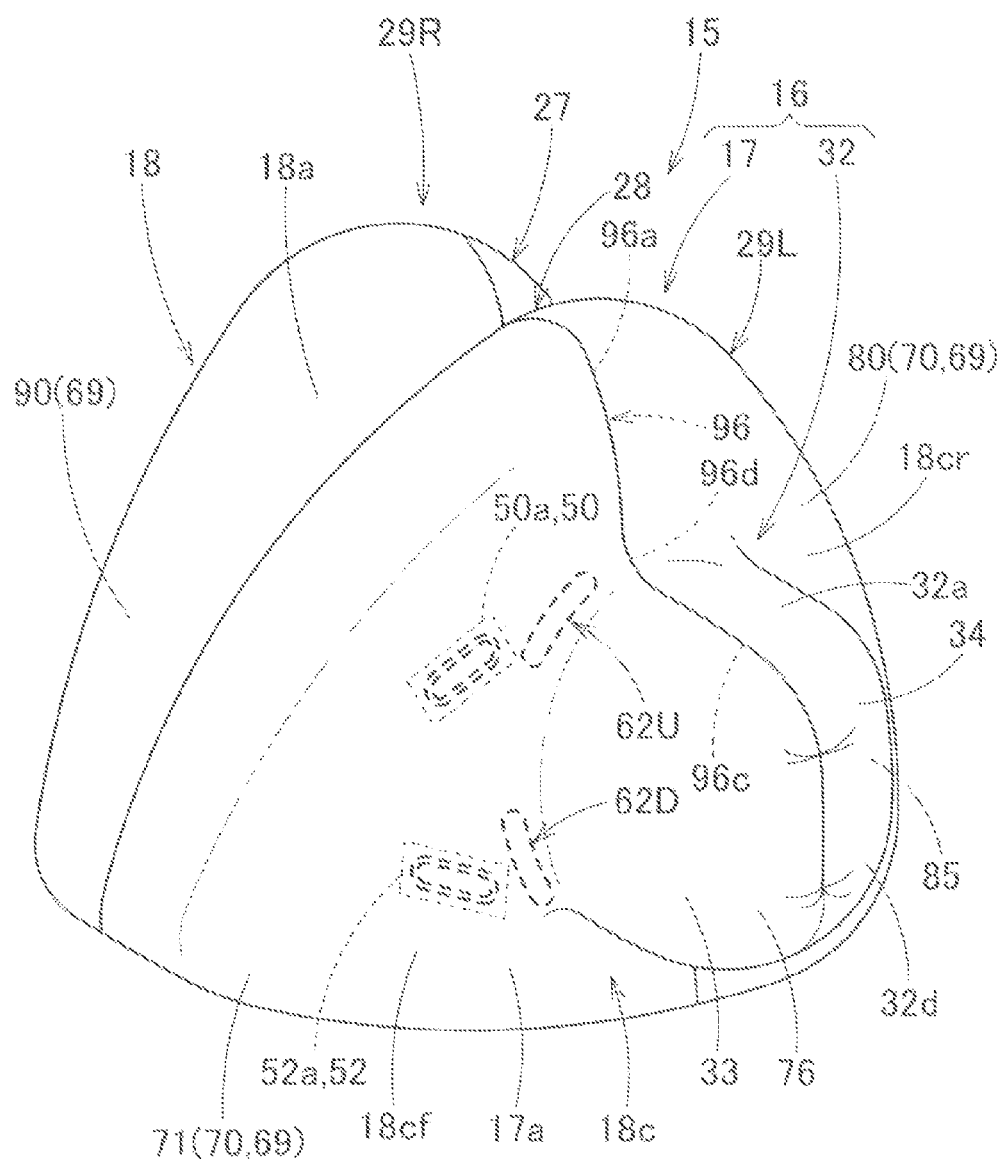
FIG. 3 is a perspective view of an airbag for use in the airbag device of FIG. 2 as inflated by itself, as viewed from left front above.
Figure 4:
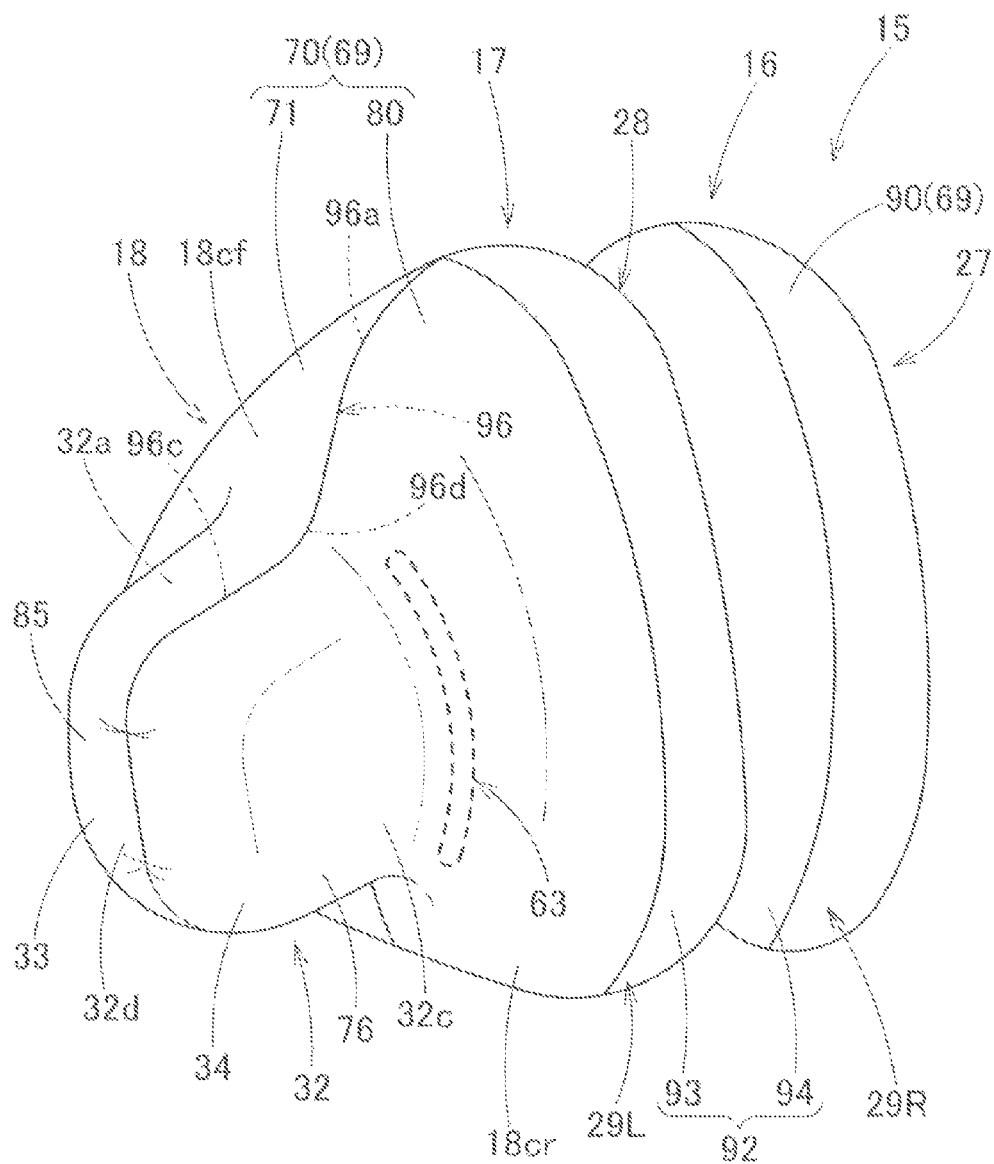
FIG. 4 is a perspective view of the airbag of FIG. 3 as viewed from left rear above.
Figure 5:
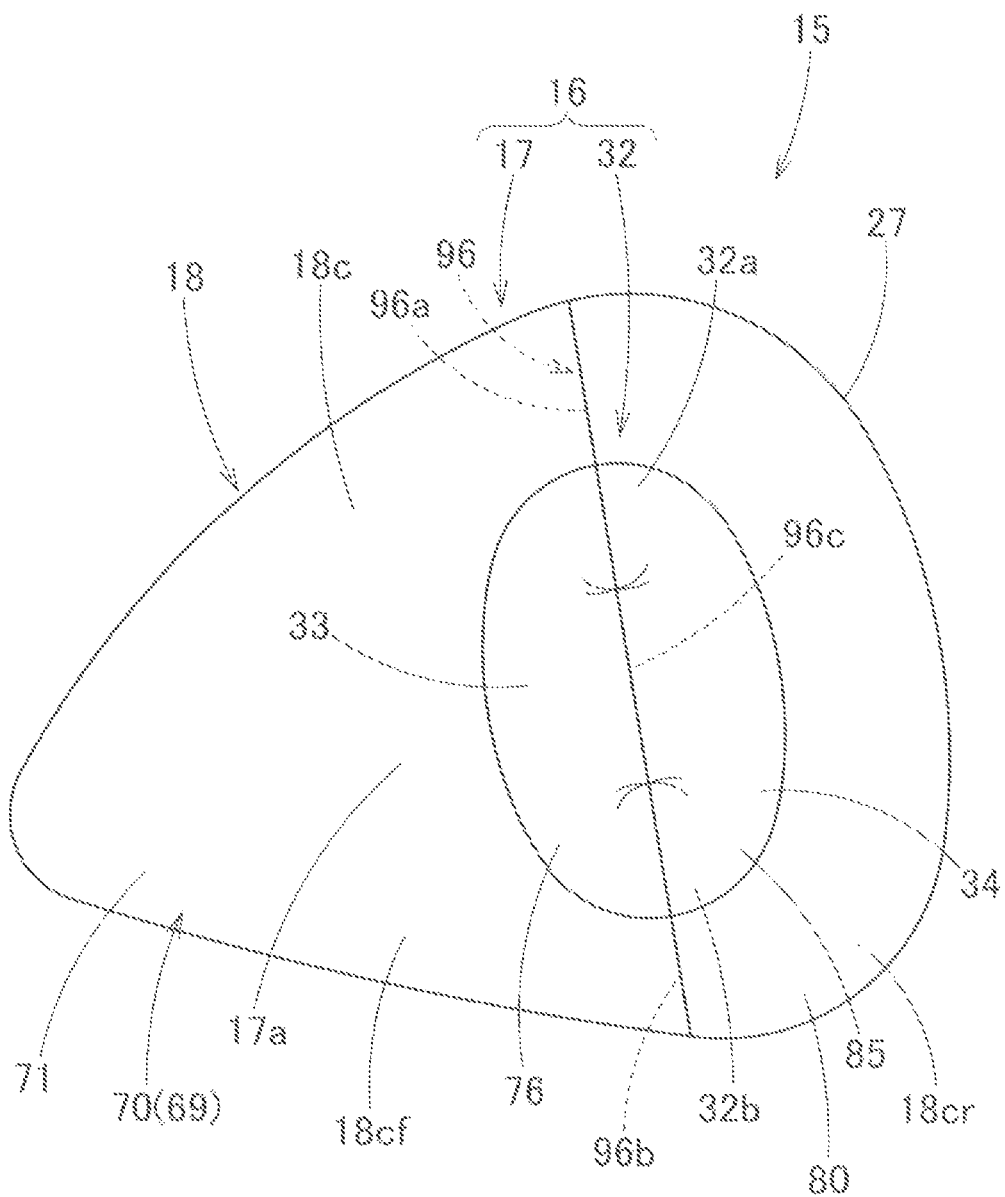
FIG. 5 is a left side view of the airbag of FIG. 3.
Figure 6:
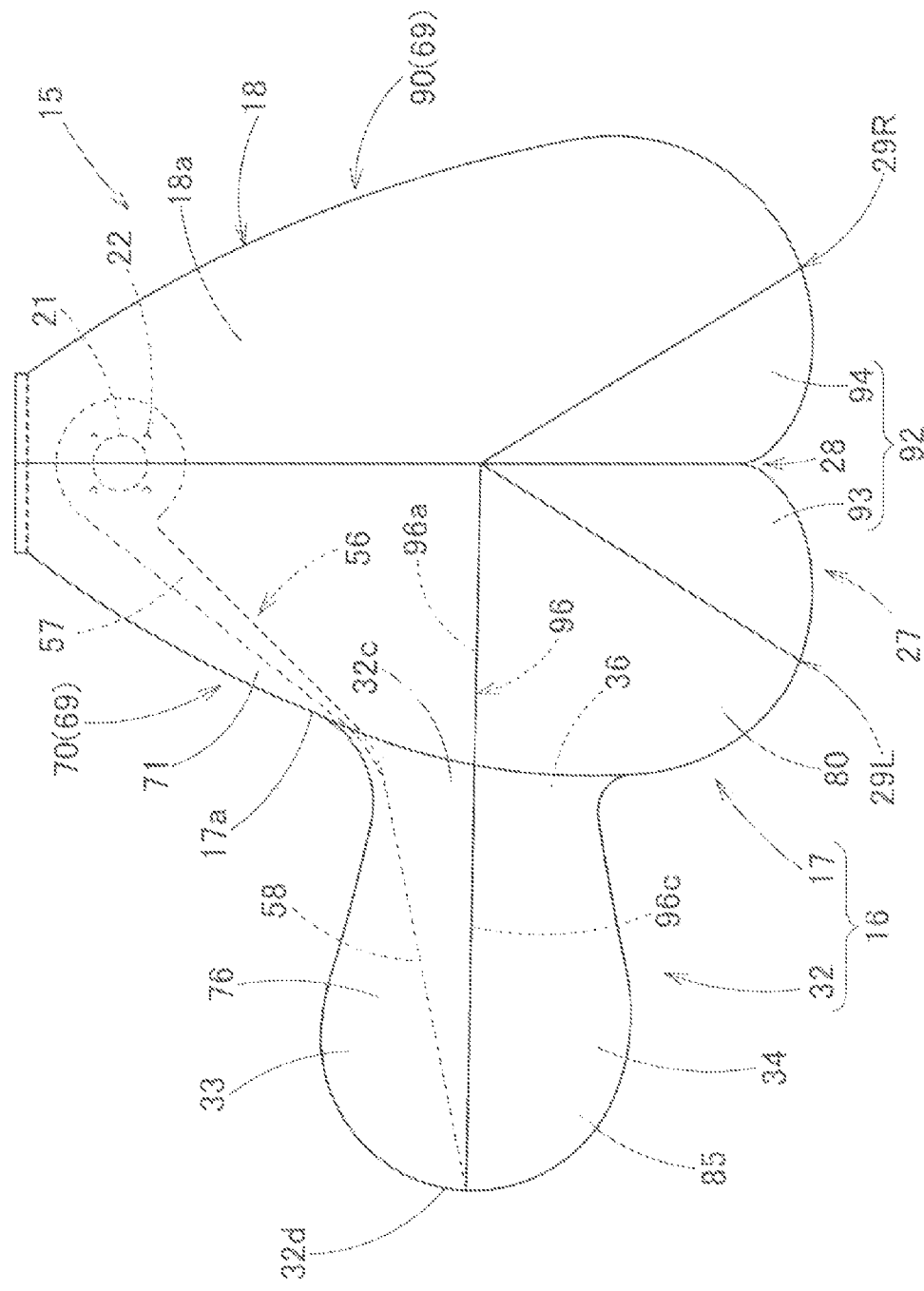
FIG. 6 is a plan view of the airbag of FIG. 3.
Figure 11:
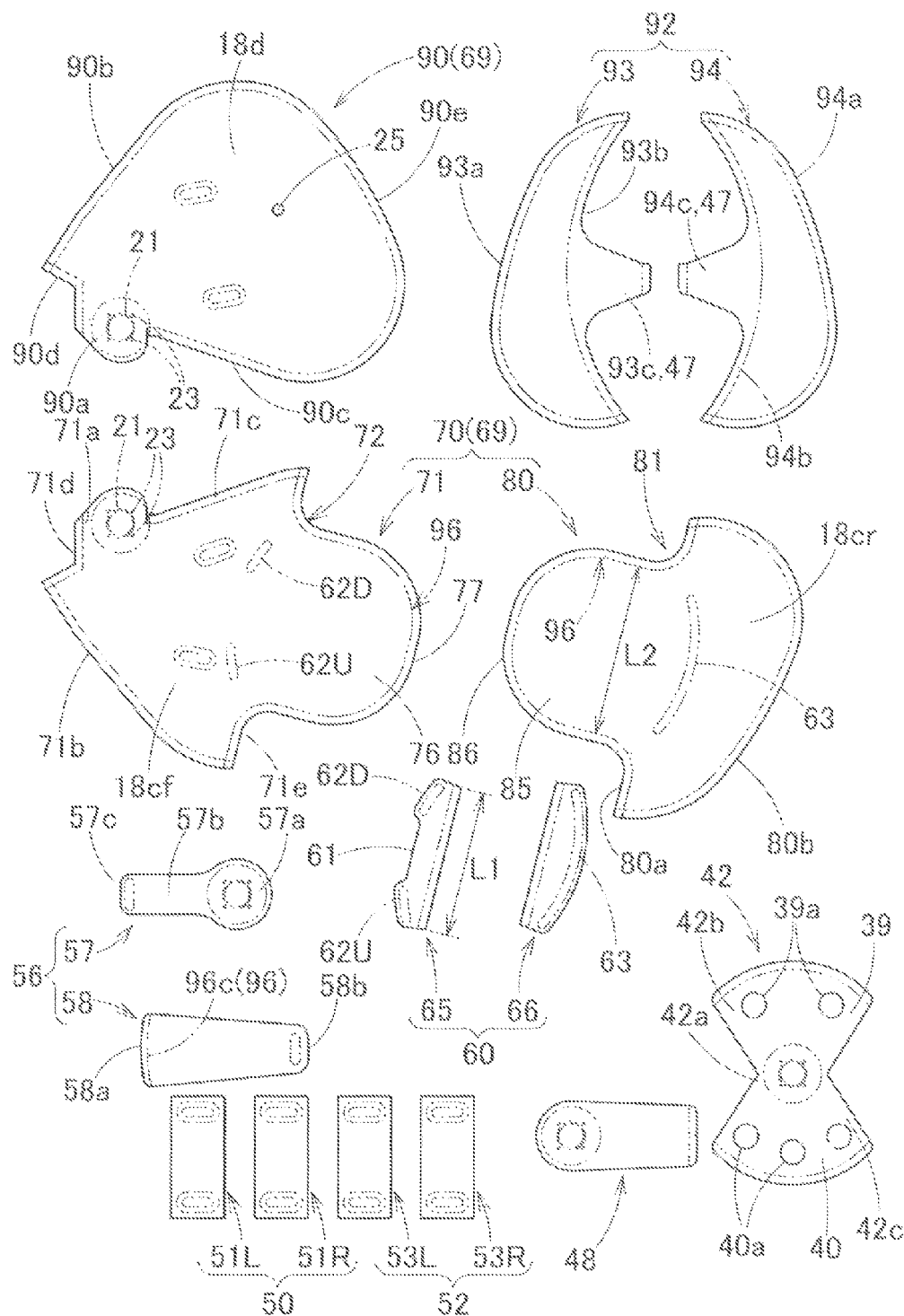
FIG. 11 depicts components of the airbag of FIG. 3 by plan views.
Figure 12:
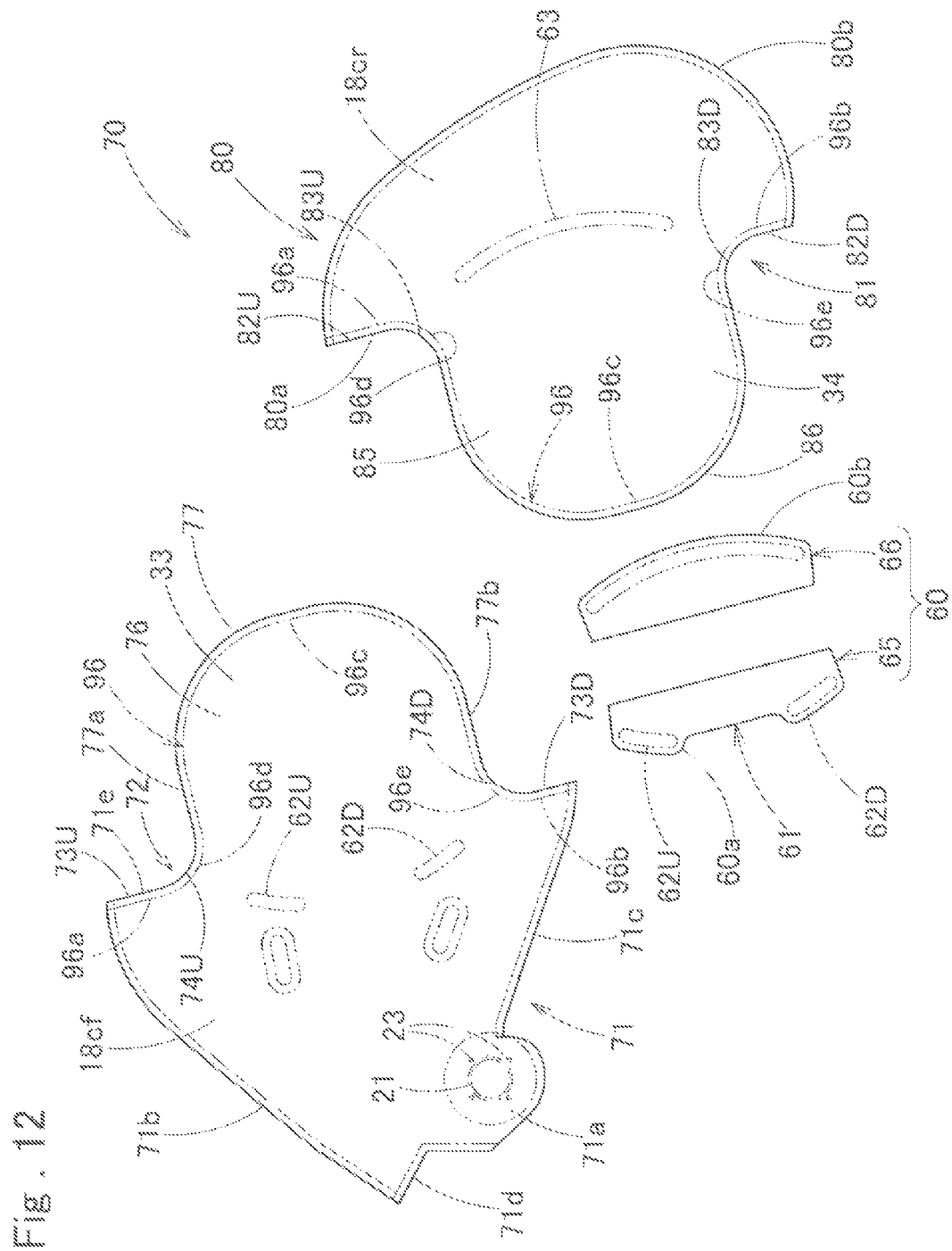
FIG. 12 depicts components of a left panel and a regulating tether of the airbag of FIG. 3 by plan views.

The circumferential wall 18 is mainly so deployable as to fill up the space between the top plane 2 of the dashboard 1 and the windshield 4, and includes an upper wall region 18a and a lower wall region 18b which are opposed to each other in an up and down direction and disposed generally along a left and right direction, and a left wall region 18c and a right wall region 18d which are opposed to each other in a left and right direction and disposed generally along a front and rear direction. A generally round gas inlet port 21 is formed in a vicinity of the front end of the lower wall region 18b (i.e., in a vicinity of the front end of the main bag section 17) for receiving the main body 8a of the inflator 8. The gas inlet port 21 is formed at a generally center in a left and right direction of the lower wall region 18b. A plurality of (four, in the illustrated embodiment) mounting holes 23 are formed in the peripheral region 22 of the inlet port 21 in the lower wall region 18b for receiving the bolts 9a of the retainer 9, which mounts the peripheral region 22 of the inlet port 21 on the bottom wall 12a of the case 12. The peripheral region 22 of the gas inlet port 21 serves as a mounting region to be mounted on the case 12. The circumferential wall 18 is provided with a generally round vent hole 25 for releasing an extra inflation gas on the right wall region 18d, as shown in FIG. 11. As shown in FIGS. 5 and 6, a seam 96, which sews together hems of a front component 71 and a rear component 80 of a later-described left panel 70, is formed generally vertically at an intermediate position in a front and rear direction of the left wall region 18c of the circumferential wall 18. The seam 96 spans a generally whole area in an up and down direction of the left wall region 18c as well as the center bag section 32, continuously, as shown in FIGS. 3 to 6. The seam 96 includes an upper region 96a which is located above the center bag section 32, a lower region 96b which is located beneath the center bag section 32, a center region 96c which is located on the center bag section 32, an upper curving region 96d which is located between the upper region 96a and center region 96c and a lower curving region 96e which is located between the center region 96c and lower region 96b, as shown in FIG. 12, and extends inside an area of the later-described left panel 70. In other words, the seam 96 extends into a left generally half area of the upper wall region 18a and a left generally half area of the lower wall region 18b. As will be described later, the seam 96 sews together a rear upper edge 73U and a front upper edge 82U, a rear upper curving region 74U and a front upper curving region 83U, outer circumferential edges 77 and 86, a rear lower curving region 74D and a front lower curving region 83D, and a rear lower edge 73D and a front lower edge 82D, of the front component 71 and rear component 80 of the left panel 70, respectively, with sewing threads.

As shown in FIGS. 1 and 13, the rear wall 27 is deployable generally vertically at the rear end of the main bag section 17 so as to face head on the front seat passenger P1 sitting in the front passenger seat PS. More particularly, the rear wall 27 is deployable at a slight slant with respect to an up and down direction in such a manner that the upper end 27a is located to the front while the lower end 27b located to the rear, as shown in FIG. 14. As shown in FIGS. 4, 6, 7 and 9, in the illustrated embodiment, the rear wall 27 at airbag deployment includes a recessed region 28 that is sunken forward and extends generally vertically, generally at the center in a left and right direction. In the illustrated embodiment, the recessed region 28 extends over a generally entire area in an up and down direction of the rear wall 27. On the left and right sides of the recessed region 28 are raised regions 29L and 29R that protrude rearward relative to the recessed region 28. That is, in the rear wall 27 of the main bag section 17 as deployed, the recessed region 28, which is sunken at the center in a left and right direction, and the raised regions 29L and 29R, which are located on the left and right of the recessed region 28, extend continuously along an up and down direction of the rear wall 27 of the bag body 16 (FIGS. 4, 6, 7 and 9). This unevenness created by the recessed region 28 and raised regions 29L and 29R extends in a uniform fashion on the rear wall 27 and converges forward on the upper wall region 18a and lower wall region 18b of the circumferential wall 18. In the illustrated embodiment, a seam which sews or joints inner circumferential edges 93b and 94b of later-described rear left panel 93 and rear right panel 94 together forms the leading end of the recessed region 28. The seam which sews up the rear edge 80b of the rear component 80 of the left panel 70 and the outer circumferential edge 93a of the rear left panel 93 forms the top of the raised region 29L, while the seam which sews up the rear edge 90e of a later-described right panel 90 and the outer circumferential edge 94a of the rear right panel 94 forms the top of the raised region 29R.

The center bag section 32 is configured to protrude towards an inboard direction or towards the driver's seat DS (i.e., towards the left, in the illustrated embodiment) out of a portion of the left wall region 18c of the main bag section 17, which forms an inboard side (i.e., the left side) 17a of the main bag section 17, at airbag deployment. As shown in FIGS. 3 to 6, the center bag section 32 is inflatable into a generally rectangular thick plate (or a flat, generally elliptic column). As indicated with double-dotted lines in FIG. 1, the center bag section 32 is deployable in front of the center seat CS for, in the illustrated embodiment, protecting the center passenger P2 sitting in the center seat CS. The protruding amount of the center bag section 32 towards the driver's seat DS at deployment of the bag body 16, i.e., the width in a left and right direction of the center bag section 32, is about three fourth of the width in a left and right direction of the main bag section 17 as inflated, such that a clearance is formed between the center bag section 32 and an airbag 104 for a steering wheel deployed in front of the driver's seat DS, as shown in FIGS. 1 and 13. More specifically, the center bag section 32 is configured to protrude towards the left at a generally center in a front and rear direction and in an up and down direction of the left wall region 18c when the bag body 16 is inflated by itself. When the airbag 15 is mounted on board, as shown in FIG. 14, the center bag section 32 is deployed at a slant with respect to an up and down direction such that the upper end 32a is located forward while the lower end 32b located rearward, at the rear of and in a proximity to the dashboard 1, as viewed from the left. The center bag section 32 of the illustrated embodiment is configured to extend generally in parallel to the rear wall 27 of the main bag section 17 as viewed from the left, as shown in FIG. 14. Further, the center bag section 32 protrudes generally horizontally out of the left wall region 18c of the main bag section 17 at airbag deployment. In other words, the center bag section 32 is deployable in such a fashion that the leading end (or left end) 32d conforms to the root end (right end) 32c in position viewed from a left and right direction and the upper edge (upper end 32a) and lower edge (lower end 32b) extends generally along a left and right direction when viewed from above or rear, as shown in FIGS. 5 and 6. In the illustrated embodiment, as shown in FIG. 14, when the center bag section 32 is deployed and bumps against the center passenger P2 who is moving forward, the center bag section 32 is pressed forward by the passenger P2 and is backed up on the front side (on the front wall region 33) by the dashboard 1, thus restraining the passenger P2.

Figure 7:
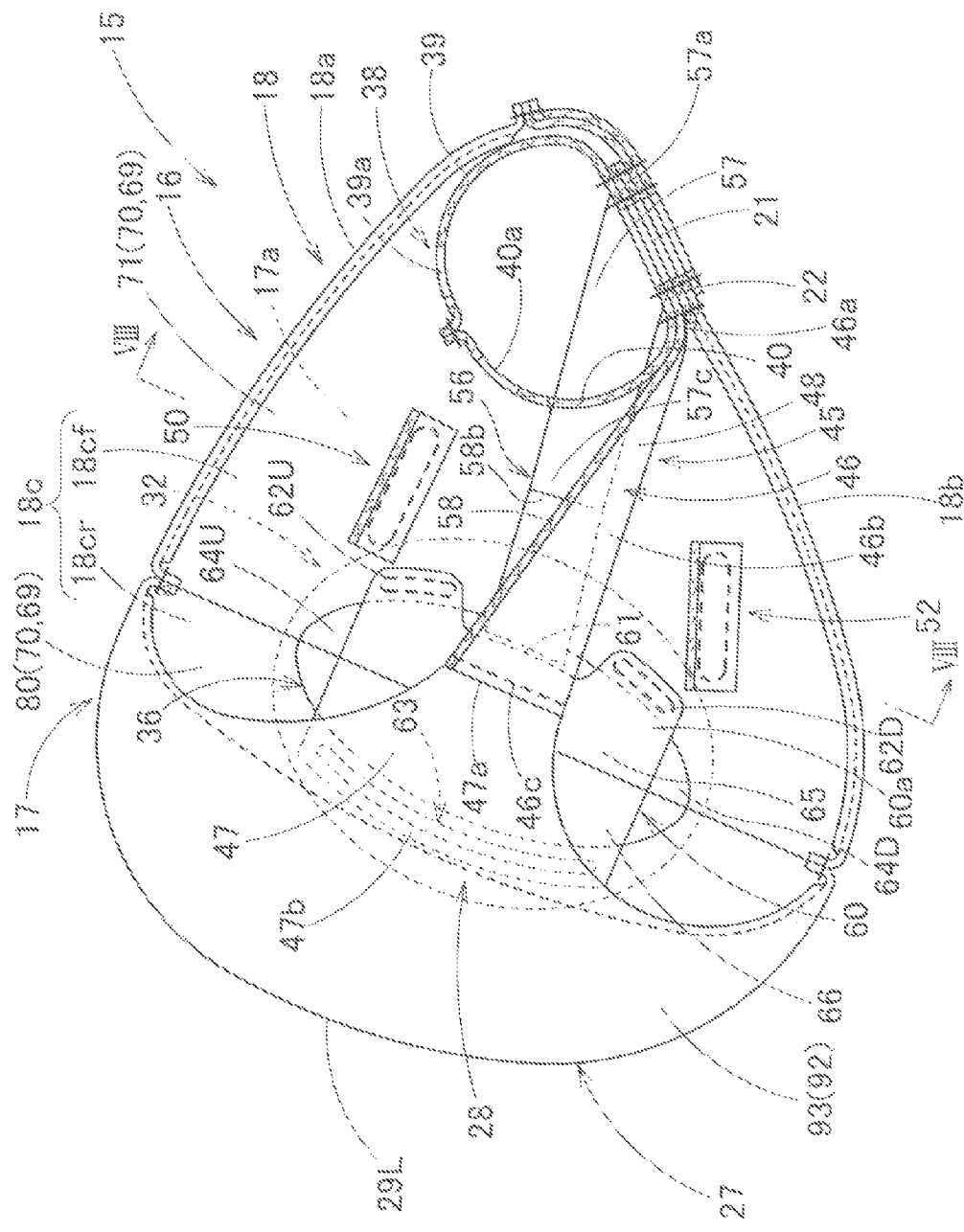
FIG. 7 is a schematic vertical sectional view of the airbag of FIG. 3.
Figure 8:
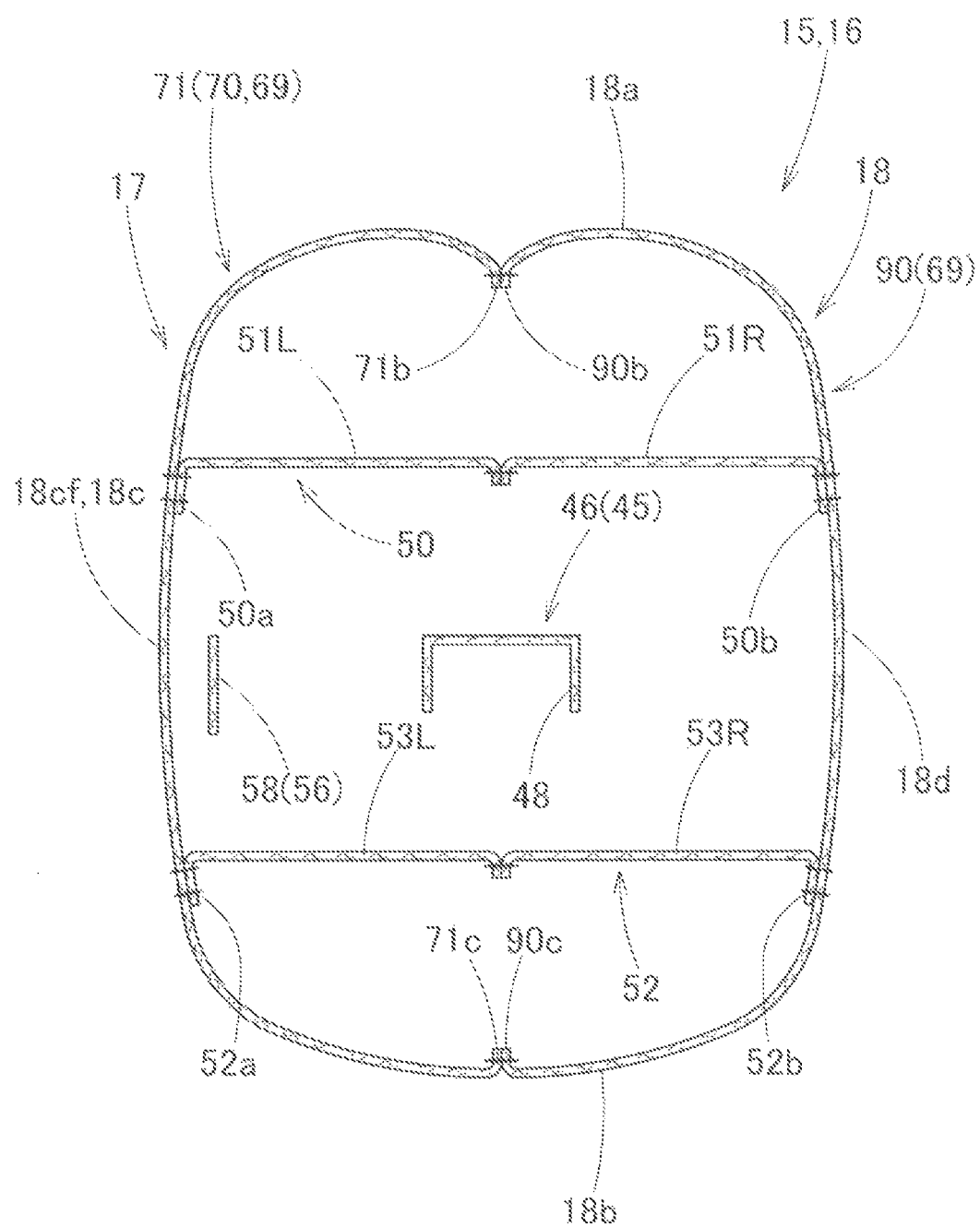
FIG. 8 is a sectional view taken along line VIII-VIII of FIG. 7.
Figure 9:
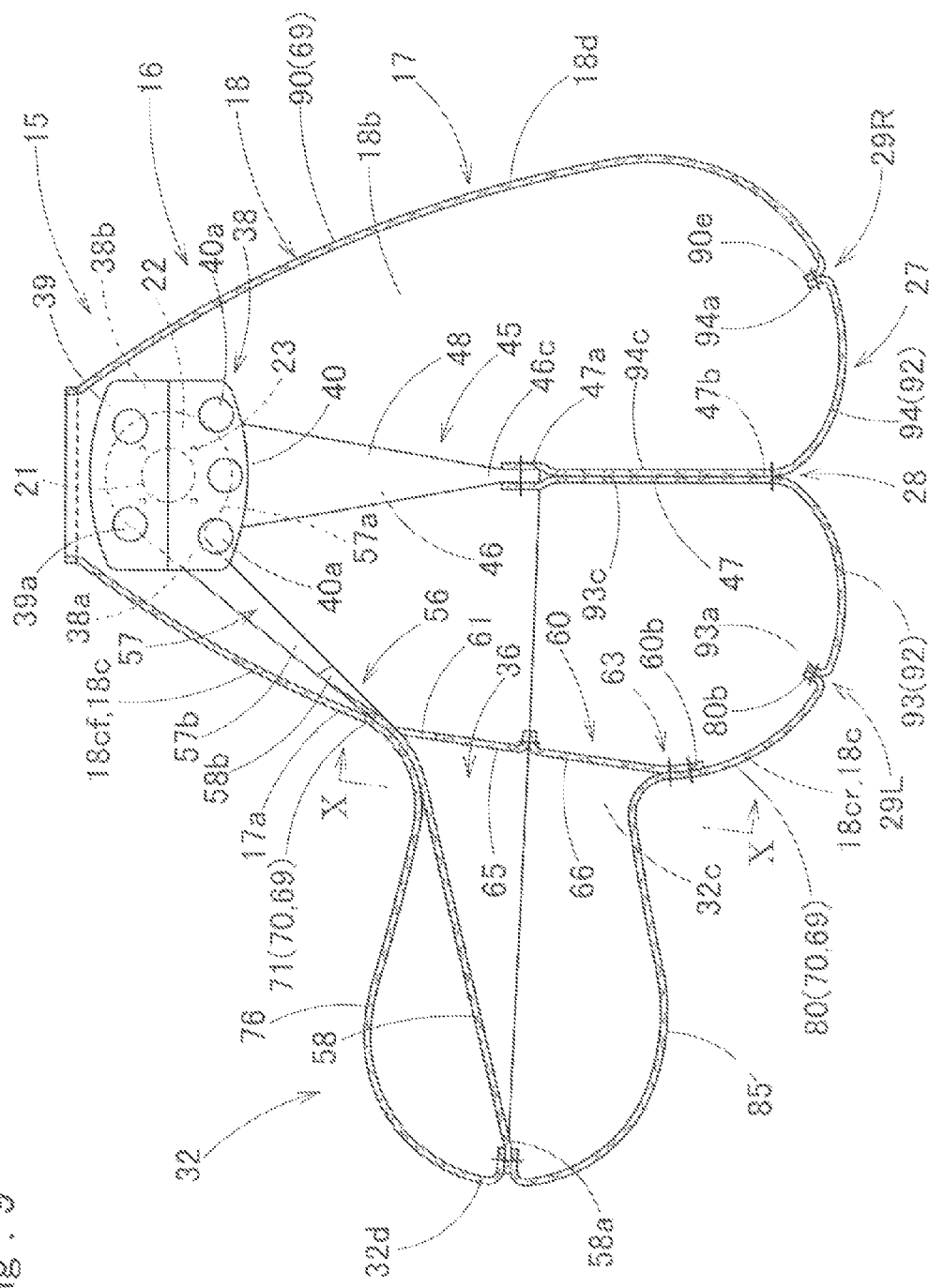
FIG. 9 is a schematic cross sectional view of the airbag of FIG. 3.

The center bag section 32 includes a front wall region 33 deployable at the front and a rear wall region 34 deployable at the rear. The center bag section 32 is further provided, at the right end (at the root end 32c) at deployment, a communicating region 36 which provides gas communication between the main bag section 17 and center bag section 32, via which the center bag section 32 takes in an inflation gas (FIGS. 7 to 9). In the illustrated embodiment, the front wall region 33 is continuous with a front region 18cf of the left wall region 18c of the main bag section 17, as shown in FIG. 3, while the rear wall region 34 is continuous with a rear region 18cr of the left wall region 18c, as shown in FIG. 4. The center region 96c of the seam 96, which continues to the left wall region 18c of the main bag section 17, is continuously disposed in the outer circumferential edge of the center bag section 32 extending from the upper end 32a to the lower end 32b via the leading end (left end) 32d. Further, the upper curving region 96d and lower curving region 96e of the seam 96 are located in a vicinity of the right end of the center bag section 32 as deployed, i.e., in a vicinity of the root end 32c where the communicating region 36 is located, such that the root-end 32c region gently enlarges towards the main bag section 17.

Referring to FIGS. 7 and 9, the redirecting cloth 38 is disposed over the gas inlet port 21 inside the bag body 16 so as to redirect inflation gas G having flown in via the inlet port 21 towards the front, rear, left and right. The redirecting cloth 38 of the illustrated embodiment is formed into a generally tube having openings at the left and right ends, and is provided with further outlet openings 39a and 40a on the tube. In the illustrated embodiment, as shown in FIG. 9, two outlet openings 39a are arranged generally along a left and right direction in the front region 39 of the redirecting cloth 38, and three outlet opening 40a are arranged generally along a left and right direction in the rear region 40 of the redirecting cloth 38. That is, the redirecting cloth 38 of the illustrated embodiment is configured to release the inflation gas towards the left and right via the left and right openings 38a and 38b, releases the gas towards the front via the openings 39a formed in the front region 39 and release the gas towards the rear via the openings 40a formed in the rear region 40. The redirecting cloth 38 is formed out of a base member 42 having a shape like an hourglass shown in FIG. 11. The central area in a front and rear direction of the base member 42 serves as a joint section 42a to the peripheral region 22 of the gas inlet port 21. The joint section 42a is provided with openings (reference numerals omitted) corresponding to the gas inlet port 21 and mounting holes 23 and is sewn to the peripheral region 22 of the gas inlet port 21 by the entire circumference of the inlet port 21. Bodies 42b and 42c of the base member 42, which extend towards opposite directions from the joint section 42a, are sewn together at the leading ends with sewing threads, thus forming the redirecting cloth 38 into a tube.

There are provided inside the bag body 16, as shown in FIGS. 7 to 10, a front-rear tether 45 disposed within an area of the main bag section 17, two left-right tethers 50 and 52 disposed within the area of the main bag section 17, a regulating tether 56 which prevents an undue protrusion of the center bag section 32 towards a vehicle interior (or towards the driver's seat DS or towards an inboard direction) at airbag deployment, and a regulating tether 60 disposed in an area of the center bag section 32.

As shown in FIGS. 7 and 9, the front-rear tether 45 is disposed along a front and rear direction of the bag body 16 as deployed inside the main bag section 17 and connects a region in a vicinity of the gas inlet port 21 and rear wall 27. The front-rear tether 45 of the illustrated embodiment is formed by jointing a front section 46 which extends from the peripheral region 22 of the gas inlet port 21 and a rear section 47 which extends from the rear wall 27.

The front section 46 of the illustrated embodiment is formed by folding a front component 48 shown in FIG. 11, and is formed into such a bilaterally symmetric, three-dimensional contour approximate to a generally triangular pyramid that the front end region extends generally along a left and right direction and the rear end region is disposed generally along an up and down direction, at airbag deployment. In the front section 46 of the illustrated embodiment, as shown in FIGS. 7 and 9, the front end region serves as a joint section 46a to the bag body 16. The joint section 46a is provided with openings (reference numerals omitted) which correspond to the gas inlet port 21 and mounting holes 23 (FIG. 11), and is sewn to the peripheral region 22 of the gas inlet port 22 by the entire circumference of the gas inlet port 21. The region of the front section 46 extending rearward from the gas inlet port 21 constitutes a main body 46b which is deployable into the three-dimensional contour approximate to a generally triangular pyramid (FIGS. 7 to 9). As shown in FIG. 7, the width in an up and down direction of the rear end 46c of the main body 46b is generally coincident with the width in an up and down direction of the front end 47a of the rear section 47. The rear end 46c of the main body 46b is jointed with the front end 47a of the rear section 47.

As shown in FIGS. 7 and 11, the rear section 47 has a sheet shape, and is composed of extended regions 93c and 94c of the rear left panel 93 and rear right panel 94 which constitute the rear wall 27. The extended regions 93c and 94c extend from the inner circumferential edges 93b and 94b of the rear left panel 93 and rear right panel 94 and are integral with the rear left panel 93 and rear right panel 94. The extended regions 93c and 94c extend from a region in a vicinity of the center of the inner circumferential edges 93b and 94b of the rear left panel 93 and rear right panel 94. In other words, the rear section 47 has a two-ply structure, and being integral with the rear left panel 93 and rear right panel 94, the rear section 47 is jointed to a generally center in four directions of the rear wall 27 (i.e. to the leading end of the recessed region 28) by the rear end 47b. More specifically, the rear section 47 has a generally trapezoidal contour which enlarges in an up and down direction towards the rear end 47b, i.e. towards the inner circumferential edges 93b and 94b of the rear left panel 93 and rear right panel 94, from a narrow front end 47a which is jointed to the front section 46.

Each of the left-right tethers 50 and 52 is disposed generally along a left and right direction and connects the left wall region 18c and right wall region 18d of the main bag section 17 inside the bag body 16 as inflated. In the illustrated embodiment, as shown in FIG. 7, the left-right tethers 50 and 52 are disposed at two positions above and below the front-rear tether 45, which positions are farther forward than the center bag section 32 as viewed from a left and right direction. As shown in FIGS. 7 and 8, each of the upper left-right tether 50, which is located above the front-rear tether 45, and the lower left-right tether 52, which is located below the front-rear tether 45, is formed into a band, and is deployable in such a manner that the length direction extends generally along a horizontal direction. More specifically, the upper left-right tether 50 is jointed to the left wall region 18c by the left end 50a while jointed to the right wall region 18d by the right end 50b in such a manner that the rear edge is located above the front edge and the width direction extends upwardly towards the rear. The lower left-right tether 52 is jointed to the left wall region 18c by the left end 52a while jointed to the right wall region 18d by the right end 52b in such a manner that the rear edge is located below the front edge and the width direction extends downwardly towards the rear. In the illustrated embodiment, each of the left-right tethers 50 and 52 is formed by jointing a pair of base cloths 51L and 51R/53L and 53R in a serial fashion in a left and right direction, as shown in FIGS. 8 and 11.

As shown in FIG. 9, the regulating tether 56 for preventing an undue protrusion of the center bag section 32 towards the vehicle interior (towards the driver's seat DS) at airbag deployment connects the leading end 32d of the center bag section 32 as deployed and the mounting region of the main bag section 17 i.e. the peripheral region 22 of the gas inlet port 21, to be jointed to the case 12. As will be described later, the regulating tether 56 of the illustrated embodiment is disposed in such a manner as to penetrate the regulating tether 60 disposed within an area of the center bag section 32. The regulating tether 56 of the illustrated embodiment is formed by jointing a right-side section 57 extending from the peripheral region 22 of the gas inlet port 21 and a left-side section 58 extending from the leading end 32d of the center bag section 32. As shown in FIG. 11, the right-side section 57 includes a joint section 57a to the peripheral region 22 of the gas inlet port 21 and a body region 57b which has a band shape and extends toward the left from the joint section 57a. The joint section 57a is provided with openings (reference numerals omitted) corresponding to the gas inlet port 21 and mounting holes 23, and is sewn to the peripheral region 22 of the gas inlet port 22 by the entire circumference of the gas inlet port 21. As shown in FIG. 11, the left-side section 58 is composed of a band-shaped sheet member, and is jointed to the leading end 32d of the center bag section 32 by the first end 58a and jointed to the leading end 57c of the body region 57b of the right-side section 57 by the second end 58b. As shown in FIG. 11, the first end 58a of the left-side section 58, which is jointed to the leading end 32d of the center bag section 32, is slightly greater in width than the second end 58b jointed to the leading end 57c of the body region 57b of the right-side section 57. In the illustrated embodiment, the first end 58a of the left-side section 58 is sewn together by the seam 96 forming the outer circumferential edge of the center bag section 32. Since the joint section 57a of the right-side section 57 is jointed to the peripheral region 22 of the gas inlet port 21 and the first end 58a of the left-side section 58 is connected to the leading end 32d of the center bag section 32 which is disposed generally along an up and down direction at airbag deployment, the regulating tether 56 at airbag deployment is twisted at the intermediate region as shown in FIG. 9. Moreover, the regulating tether 56 is deployed in a tense fashion while being bent in a vicinity of a later-described recessed region 61 of the regulating tether 60.

Figure 10:
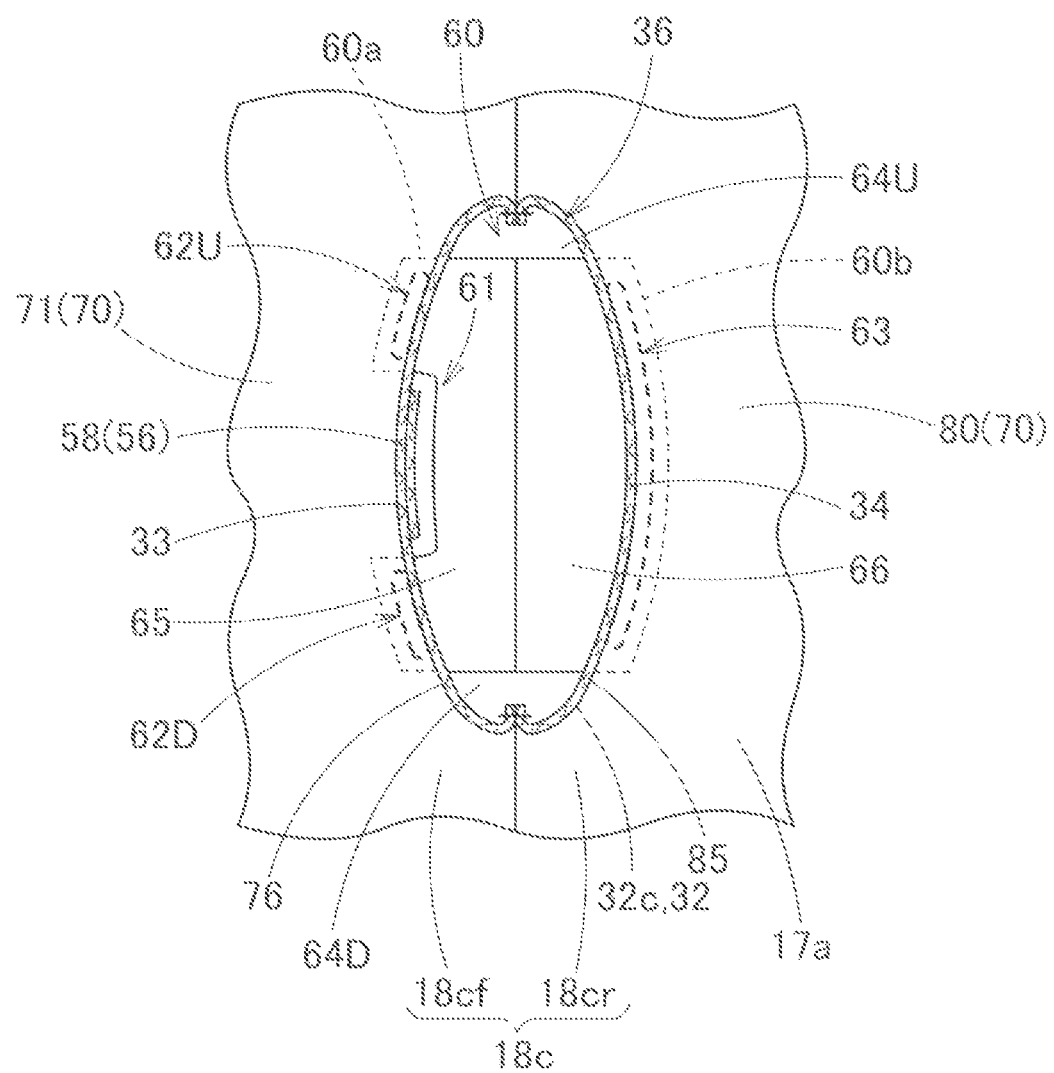
FIG. 10 is a sectional view taken along line X-X of FIG. 9.

The regulating tether 60 is disposed within the area of the center bag section 32 for regulating a clearance in a front and rear direction of a vicinity of the root end 32c region of the center bag section 32, i.e. of a vicinity of the communicating region 36 between the main bag section 17 and center bag section 32. As shown in FIG. 9, the regulating tether 60 is deployed generally along a front and rear direction in the vicinity of the root end 32c region of the center bang section 32 (i.e., in the vicinity of the communicating region 36). The regulating tether 60 controls the contour of a region in the vicinity of the root end 32c region of the center bang section 32 as deployed as well as regulates the clearance in a front and rear direction of the vicinity of the root end 32c region (or communicating region 36) of the center bag section 32. As shown in FIGS. 7 and 10, the regulating tether 60 has an outer contour like a rugby ball (a flat ellipse) elongated in a length direction (i.e. up and down direction) of a cross-sectional shape of the root end 32c region of the center bag section 32, and is jointed (sewn) to the front wall region 33 of the center bag section 32 by the front edge 60a, which has a curved shape, and jointed (sewn) to the rear wall region 34 by the rear edge 60b, which also has a curved shape. The front edge 60a of the regulating tether 60 is provided with a recessed region 61 for letting through the left-side section 58 of the regulating tether 56. The recessed region 61 is formed by making a partial dent in a central region in an up and down direction of the front edge 60a of the regulating tether 60. The width in an up and down direction of the recessed region 61 is such as to allow the left-side section 58 of the regulating tether 56 to go through. In the illustrated embodiment, it is about one third of the width L1 in an up and down direction of the regulating tether 60. As shown in FIG. 11, the width L1 in an up and down direction (i.e. the width in a direction of the long axis) of the regulating tether 60 is slightly smaller than the width L2 in an up and down direction of the center bag section 32 as flattened, such that gaps 64U and 64D are formed above and beneath the regulating tether 60 for providing gas communication between the main bag section 17 and center bag section 32, as shown in FIGS. 7 and 10. Accordingly, an inflation gas fed into the main bag section 17 flows into the center bag section 32 via the gaps 64U and 64D formed above and beneath the regulating tether 60 and via the recessed region 61 formed in the front edge 60a of the regulating tether 60.

The rear edge 60b of the regulating tether 60 is sewn to the rear wall region 34 by a rear seam 63. The rear seam 63 is formed over an entire area of the rear edge 60b and has a generally arc-like shape curving along the curvature of the rear edge 60b. The front edge 60a of the regulating tether 60 is sewn to the front wall region 33 by front seams 62U and 62D formed above and beneath the recessed region 61. Each of the front seams 62U and 62D is formed into a generally arc-like shape curving along the curvature of the front edge 60a. That is, since the front edge 60a and rear edge 60b of the regulating tether 60 except the recessed region 61 are sewn all over to the left wall region 18c (more particularly, to a rear edge region 72 of the front component 71 and to a front edge region 81 of the rear component 80) which forms the root end 32c region (the vicinity of the communicating region 36) of the center bag section 32, the regulating tether 60 regulates the outer contour or sectional contour of the region in the vicinity of the root end 32c region of the center bag section 32 (i.e. the vicinity of the communicating region 36) as deployed, and helps form the sectional contour of the region in the vicinity of the root end 32c region of the center bang section 32 (i.e. the vicinity of the communicating region 36) into a flat ellipse at deployment, as shown in FIG. 10. In the airbag 15 of the illustrated embodiment, in a precise sense, the front seams 62U and 62D and rear seam 63 sewing the front edge 60a and rear edge 60b of the regulating tether 60 are formed in a region constituting the main bag section 17, not in an area of the center bag section 32. More specifically, as shown in FIGS. 11 and 12, the front seams 62U and 62D are located in a region farther forward of the rear upper edge 73U and rear lower edge 73D of the front component 71 of the left panel 70 as flattened, i.e. in the rear edge region 72. The rear seam 63 is located in a region farther rearward of the front upper edge 82U and front lower edge 82D of the rear component 80 of the left panel 70 as flattened, i.e. in the front edge region 81. In other words, at airbag deployment, the regulating tether 60 is located to the main bag section 17 with respect to the upper curving region 96d and lower curving region 96e, of the seam 96, which define the communicating region 36 of the center bag section 32. The width in a front and rear direction of the regulating tether 60 (i.e. a clearance between the rear seam 63 and front seams 62U and 62D) is such as not to make a thickness of the region in the vicinity of the root end 32c region of the center bang section 32 (i.e. the vicinity of the communicating region 36) as deployed too thin. As shown in FIG. 11, the regulating tether 60 of the illustrated embodiment is composed of a front section 65 and a rear section 66 and is formed by sewing the rear edge of the front section 65 and the front edge of the rear section 66 together with sewing threads.

The bag body 16 is formed by sewing together circumferential edges of predetermined shaped base cloths. As shown in FIGS. 11 and 12, the bag body 16 of the illustrated embodiment is composed of circumferential panels 69 for mainly forming the circumferential wall 18 of the main bag section 17 and center bag section 32, and rear panels 92 for mainly forming the rear wall 27 of the main bag section 17. The circumferential panels 69 include a left panel 70 and a right panel 90, and the rear panels 92 include a rear left panel 93 and a rear right panel 94.

The left panel 70 and right panel 90 each constitute a left half region and a right half region of the circumferential wall 18.

The left panel 70 constitute the center bag section 32 and generally the left half region of the circumferential wall 18 of the main bag section 17. More specifically, the left panel 70 constitutes the left wall region 18*c*, a left front half area of the upper wall region 18*a* and a left front half area of the lower wall region 18*b*. As shown in FIGS. 11 and 12, the left panel 70 is composed of two split parts; a front component 71 for forming a front part of the left panel 70 and a rear component 80 for forming a rear part of the left panel 70. The left panel 70 generally conforms, in outer contour, to the right panel 90 in a state where a later-described rear extended region 76 and a front extended region 85 are mated and sewn together by the rear edge 71*e* of the front component 71 (i.e. the rear upper edge 73U and rear lower edge 73D of the rear edge region 72) and front edge 80*a* of the rear component 80 (i.e. the front upper edge 82U and front lower edge 82D of the front edge region 81). The left panel 70 is split up into front and rear at the widest position in that state.

The front component 71 is provided, in a vicinity of the front end, with a protruding region 71*a* for forming the peripheral region 22 of the gas inlet port 21, and is further provided with a rear extended region 76 which protrudes rearward from the rear edge 71*e* in a flatly developed state. The rear component 80 includes a front extended region 85 which protrudes forward from the front edge 80*a* in a flatly developed state and has a generally identical outer contour to the rear extended region 76. The center bag section 32 is formed by the rear extended region 76 of the front component 71 and the front extended region 85 of the rear component 80.

The rear extended region 76 of the front component 71 is a generally rectangular area protruding rearward from an intermediate position in an up and down direction of the rear edge 71*e* of the front component 71, and constitutes the front wall region 33 of the center bag section 32. The rear extended region 76 is considerably rounded at the corners such that the outer circumferential edge forms a curve. As shown in FIG. 12, between the rear upper edge 73U of the rear edge region 72 and the rear extended region 76, there is formed a rear upper curving region 74U which is a curve joining the outer circumferential edge 77 of the rear extended region 76 and rear upper edge 73U gently. Between the rear lower edge 73D of the rear edge region 72 and the rear extended region 76, there is formed a rear lower curving region 74D which is a curve joining the outer circumferential edge 77 of the rear extended region 76 and rear lower edge 73D gently. In the illustrated embodiment, the upper edge 77*a* and lower edge 77*b* of the outer circumferential edge 77 of the rear extended region 76 are orthogonal to the rear upper edge 73U and rear lower edge 73D. The rear upper curving region 74U is formed into a generally quarter arc to which both the rear upper edge 73U and upper edge 77*a* are tangential. The rear lower curving region 74D is formed into a generally quarter arc to which both the rear lower edge 73D and lower edge 77*b* are tangential. The rear upper curving region 74U and rear lower curving region 74D are identical in curvature.

The front extended region 85 of the rear component 80 is a generally rectangular area protruding forward from an intermediate position in an up and down direction of the front edge 80*a* of the rear component 80, and constitutes the rear wall region 34 of the center bag section 32. As shown in FIG. 12, an outer contour of the front edge region 81 of the rear component 80 including the front extended region 85 (i.e., an outer contour of the front upper edge 82U, an outer circumferential edge 86 of the front extended region 85 and the front lower edge 82D) is identical to an outer contour of the rear edge region 72 of the front component 71 including the rear extended region 76 (i.e. an outer contour of the rear upper edge 73U, the outer circumferential edge 77 of the rear extended region 76 and the rear lower edge 73D). That is, in the rear component 80, a front upper curving region 83U is formed between the front upper edge 82U and front extended region 85, and a front lower curving region 83D is formed between the front lower edge 82D and front extended region 85, corresponding to the rear upper curving region 74U and rear lower curving region 74D.

The right panel 90 constitutes a generally right half region of the circumferential wall 18 of the main bag section 17, more particularly, constitutes the right wall region 18*d*, a right front half region of the upper wall region 18*a*, and a right front half region of the lower wall region 18*b*. The right panel 90 is provided, in a vicinity of the front end, with a protruding region 90*a* for forming the peripheral region 22 of the gas inlet port 21. The upper edge 71*b* of the front component 71 and the upper edge 90*b* of the right panel 90, and the lower edge 71*c* of the front component 71 and the lower edge 90*c* of the right panel 90 are sewn together, thus the left panel 70 and right panel 90 form the generally tubular circumferential wall 18, as shown in FIG. 8.

The rear left panel 93 and rear right panel 94, which constitute the rear panels 92, form an area of the rear wall 27 of the main bag section 17 between the tops of the raised regions 29L and 29R, as shown in FIG. 9. More specifically, the panels 93 and 94 form a rear area of the upper wall region 18*a* of the circumferential wall 18, an area of the rear wall 27 between the tops of the raised regions 29L and 29R, and a rear area of the lower wall region 18*b*. As shown in FIG. 11, the rear left panel 93 and rear right panel 94 are configured into a pair of bands each formed into a shape like a crescent moon such that each panel 93/94 forms the left/right half of the above-described region with respect to the leading end of the recessed region 28. That is, the rear left panel 93 constitutes an area from the leading end of the recessed region 28 to the top of the left raised region 29L while the rear right panel 94 constitutes an area from the leading end of the recessed region 28 to the top of the right raised region 29R, as shown in FIG. 11. Each of the rear left panel 93 and the rear right panel 94 is provided, at the inner circumferential edge 93*b*/94*b* with an extended region 93*c*/94*c* for forming the rear section 47 of the front-rear tether 45, as shown in FIGS. 9 and 11. In a flatly developed state, the outer circumferential edges 93*a* and 94*a* of the rear left panel 93 and rear right panel 94 are generally identical in curved shape to the rear edge 80b of the rear component 80 of the left panel 70 and the rear edge 90e of the right panel 90.

In the illustrated embodiment, the circumferential panels 69 and rear panels 92 for forming the bag body 16, the front component 48 for forming the front-rear tether 45, the base cloths 51L, 51R, 53L and 53R for forming the upper left-right tether 50 and lower left-right tether 52, the left-side section 58 and right-side section 57 of the regulating tether 56 and the front section 65 and rear section 66 of the regulating tether 60 are formed of a flexible woven fabric of polyester yarn, polyimide yarn or the like.

Manufacturing of the airbag 15 is now described. In advance, the rear left panel 93 and rear right panel 94 are mated in a flattened state and sewn together by the inner circumferential edges 93b and 94b with a sewing thread. The front section 65 and rear section 66 of the regulating tether 60 are sewn to the front component 71 and rear component 80 of the left panel 70. An end of each of the base cloths 51L, 51R, 53L and 53R of the left-right tethers 50 and 52 are sewn to the front component 71 of the left panel 70 and right panel 90.

Firstly, the front component 71 and rear component 80 of the left panel 70 are mated such that the circumferential edges of the rear edge region 72 and front edge region 81 match each other and sandwich the first end 58a of the left-side section 58 of the regulating tether 56 there between. The front component 71 and rear component 80 are then sewn together with sewing threads continuously by the front upper edge 82U and rear upper edge 73U, the front upper curving region 83U and rear upper curving region 74U, the outer circumferential edge 86 of the front extended region 85 and outer circumferential edge 77 of the rear extended region 76, the front lower curving region 83D and rear lower curving region 74D, and the front lower edge 82D and rear lower edge 73D, thus the seam 96 and the left panel 70 are formed. At the same time, the center bag section 32 is formed with the first end 58a of the left-side section 58 of the regulating tether 56 jointed to the leading end 32d. Then the center bag section 32 is turned inside out so the seam allowance of the center region 96c of the seam 96 is disposed inside, and the front section 65 and rear section 66 of the regulating tether 60 are sewn together with a sewing thread, thus forming the regulating tether 60. The left-side section 58 of the regulating tether 56 is put through the recessed region 61 of the regulating tether 60.

Thereafter, the left panel 70 and right panel 90 are mated such that the circumferential edges match each other, and are sewn together with sewing threads by the lower edges 71c and 90c. Then the left panel 70 and right panel 90 are opened and the protruding regions 71a and 90a are laid one over the other. Subsequently, the joint section 46a of the front component 48 of the front-rear tether 45, the joint section 57a of the right-side section 57 of the regulating tether 56, and the joint section 42a of the base member 42 of the redirecting cloth 38 are placed on the protruding regions 71a and 90a in order, and sewn thereto with a sewing thread by the region to be the peripheral region 22 of the gas inlet port 21. Then the gas inlet port 21 and mounting holes 23 are punched out. Then the upper edge 71b of the left panel 70 and upper edge 90b of the right panel 90 are sewn together with a sewing thread. Thereafter, the left panel 70 and right panel 90 are so opened that the rear edges 80b and 90e are separated from each other, and the rear left panel 93 and rear right panel 94, which have been so opened as to separate the outer circumferential edges 93a and 94a from each other, are mated thereto. Then the rear edge 80b of the left panel 70 and the outer circumferential edge 93a of the rear left panel 93 are sewn together with a sewing thread while the rear edge 90e of the right panel 90 and the outer circumferential edge 94a of the rear right panel 94 are sewn together with a sewing thread. Then the redirecting cloth 38 is formed by sewing outer circumferential edges of the bodies 42b and 42c of the base member 42. The main body 46b of the front section 46 of the front-rear tether 45 is double-folded, and the doubled rear end 46c is sewn to the front end 47a of the rear section 47 (i.e., to the front ends of the extended regions 93c and 94c of the rear left panel 93 and rear right panel 94), thus forming the front-rear tether 45. The leading end 57c of the body region 57b of the right-side section 57 is sewn to the second end 58b of the left-side section 58, thus forming the regulating tether 56. The upper left-right tether 50 and lower left-right tether 52 are formed by sewing corresponding ends of the base cloths 51L, 51R, 53L and 53R together. Then the bag body 16 is turned inside out via an unsewn region at the front edges 71d and 90d of the left panel 70 and right panel 90 such that seam allowances may be disposed inside. Then if each of the front edges 71d and 90d of the left panel 70 and right panel 90 is doubled and sewn up with a sewing thread, the airbag 15 is completed.

As shown in FIGS. 1 and 13, an airbag device 103 for a steering wheel is mounted on the steering wheel 100 mounted in front of the driver's seat DS located to the left of the center seat CS. The airbag device 103 includes an airbag 104, which is stored in the boss 101 of the steering wheel 100 in a folded-up configuration, and an inflator (not shown) for feeding the airbag 104 with an inflation gas. The airbag 104 is composed of a sheet material having flexibility and configured to be deployed over the top plane (or rear plane) of the steering wheel 100 when fed with an inflation gas (FIGS. 1 and 13). Similarly to the inflator 8 of the airbag device M for a front passenger seat, the inflator of the airbag device 103 for a steering wheel is configured to be actuated in the event of a frontal collision of the vehicle V.

Mounting of the airbag device M for a front passenger seat on the vehicle V is now described. The retainer 9 is housed in the airbag 15 produced as described above in a predetermined fashion, and the airbag 15 is folded up. Then the airbag 15 is wrapped up by a tearable wrapping sheet (not shown) for keeping the folded-up configuration. Then the airbag 15 is placed on the bottom wall 12a of the case 12, and the main body 8a of the inflator 8 is set in the case 12 from the lower side of the bottom wall 12a such that the bolts 9a of the retainer 9 projecting downwardly out of the bottom wall 12a are put through the flange 8c of the inflator 8. If then the bolts 9a projecting out of the flange 8c of the inflator 8 are fastened with nuts 10, the airbag 15 and the inflator 8 are mounted on the case 12.

Thereafter, the circumferential wall 12b of the case 12 is coupled to the joint wall 6c of the airbag cover 6 on the dashboard 1, which has been mounted on the vehicle V, and not-shown brackets of the case 12 are secured to the vehicle body structure. Thus the airbag device M for a front passenger seat is mounted on the vehicle V.

After the airbag device M is mounted on the vehicle V, in the event of a frontal collision of the vehicle, the inflator 8 discharges an inflation gas G from the gas discharge ports 8b to inflate the airbag 15. Then the airbag 15 pushes and opens the doors 6a and 6b of the airbag cover 6 and protrudes upward out of the case 12, and is deployed rearward in such a manner as to fill a space between the top plane 2 of the dashboard 1 and windshield 4, as shown in FIGS. 2 and 14. At the same time, the airbag 104 for a steering wheel is also fed with an inflation gas and deployed over the top plane (or rear plane) of the steering wheel 100 (FIGS. 1 and 13).

In the airbag device M for a front passenger seat of the illustrated embodiment, the center bag section 32 is configured to protrude out of a portion of the main bag section 17. The center bag section 32 is formed by jointing outer circumferential edges 77 and 86 of the rear extended region 76 and front extended region 85 of the front component 71 and rear component 80 of the left panel 70. That is, the region of the main bag section 17 surrounding the center bag section 32 (i.e., the inboard-side region of the main bag section 17, or the left wall region 18c of the circumferential wall 18) is composed of the left panel (or inboard-side member) 70, and the left panel 70 is composed of two originally separate members, i.e., the front component 71 and rear component 80, each of which forms the front part and rear part of the inboard-side region of the main bag section 17. The center bag section 32 is formed by jointing the outer circumferential edges 77 and 86 of the rear extended region 76 and front extended region 85 of the front component 71 and rear component 80. This simple configuration will contribute to reduction of manufacturing time and costs. In other words, each of the front wall region 33 and rear wall region 34 of the center bag section 32 is continuous with the front region 18cf/rear region 18cr of the left wall region 18c of the main bag section 17, as shown in FIG. 3 (that is, the front wall region 33 and rear wall region 34 of the center bag section 32 are continuous with the inboard-side region of the main bag section 17). This configuration will help generate a great tension force on outer surfaces of the front wall region 33 and rear wall region 34 of the center bag section 32 when the center bag section 32 gains a high internal pressure due to an inflation gas upon airbag deployment. Therefore, in spite of its limited volume, the center bag section 32 has a good shape retention property when inflated and deployed, thus will catch the center passenger P2 smoothly without being tumbled forward by the center passenger P2.

Therefore, the airbag device M for a front passenger seat of the embodiment will be capable of catching a center passenger P2 steadily with the center bag section 32 without increasing a volume of the airbag unduly and with a simple configuration.

In the airbag device M of the illustrated embodiment, each of the outer circumferential edges 77 and 86 of the rear extended region 76 and front extended region 85 is formed into such a curve that continues gently to the rear edge of the front component 71 (i.e., to the rear upper edge 73U and rear lower edge 73D)/to the front edge of the rear component 80 (i.e., to the front upper edge 82U and front lower edge 82D), at the boundary with the rear edge of the front component 71 (i.e., the left wall region 18c)/the front edge of the rear component 80 (i.e., the left wall region 18c). The center bag section 32 and the left wall region 18c (or inboard-side region) of the main bag section 17 is formed by sewing together outer circumferential edges of the rear edge region 72 and front edge region 81 of the front component 71 and rear component 80 (i.e. the rear upper edge 73U and front upper edge 82U, the rear upper curving region 74U and front upper curving region 83U, the outer circumferential edges 77 and 86 of the rear extended region 76 and front extended region 85, the rear lower curving region 74D and front lower curving region 83D, and the rear lower edge 73D and front lower edge 82D) with a sewing thread. With this configuration, at airbag deployment, the root end 32c region of the center bag section 32 is formed into a generally truncated cone gently continuing from the main bag section 17. That is, in the airbag device M of the illustrated embodiment, there will be formed no partial dented region between the center bag section 32 and the main bag section 17 at airbag deployment. This configuration will further prevent the center bag section 32 from bending forward at the root end 32c region with respect to the main bag section 17 when catching the center passenger P2, and help catch the center passenger P2 in a further adequate fashion.

Moreover, the airbag 15 of the airbag device M includes the regulating tether 56 that joints the leading end 32d region of the center bag section 32 as deployed and the peripheral region 22 of the gas inlet port 21 of the main bag section 17 inside the airbag 15. The regulating tether 56 will prevent the center bag section 32 from protruding towards the vehicle interior (i.e., towards the driver's seat DS) in an undue fashion in an initial stage of airbag deployment, and help inflate and deploy the main bag section 17 and center bag section 32 quickly without causing an undue oscillation.

The airbag 15 of the airbag device M further internally includes the regulating tether 60 for regulating a clearance in a front and rear direction of a vicinity of the communicating region 36 between the main bag section 17 and center bag section 32. The regulating tether 60 will prevent a region in the vicinity of the communicating region 36 from being enlarged greatly in a front and rear direction at airbag deployment, and help steady the outer contour of not only the center bag section 32 but also the whole airbag 15 (bag body 16) including the main bag section 17 at deployment quickly. Furthermore, the regulating tether 60 is located to the main bag section 17 with respect to the upper curving region 96d and lower curving region 96e of the seam 96 which defines the periphery of the communicating region 36 in the root end 32c region of the center bag section 32. This configuration will help maintain such a shape of the root end 32c region of the center bag section 32 that enlarges towards the main bag section 17 at deployment, and the center bag section 32 will be further steadily supported by the main bag section 17.

If an attention is focused on the configuration that the regulating tether 60 can be used to regulate the clearance in a front and direction of the vicinity of the communicating region 36 between the main bag section 17 and center bag section 32 for steadying the contour of the region in the vicinity of the communicating region 36 at deployment and quickly and steadily inflating the center bag section 32, an airbag device for a front passenger seat may be configured such that an airbag 15 includes:

- a main bag section 17 that is deployable in front of the front passenger seat and includes an inboard-side region deployable to face a vehicle interior;
- a center bag section 32 that is disposed on the inboard-side region of the main bag section 17 and deployable in such a manner as to protrude towards the vehicle interior (i.e., towards the driver's seat DS) out of a portion of the inboard-side region of the main bag section 17;
- a communicating region 36 that provides gas communication between the main bag section 17 and the center bag section 32; and
- a regulating tether 60 that is disposed inside the airbag 15 and regulates a clearance in a front and rear direction of a vicinity of the communicating region 36, a front edge 60a region of the regulating tether 60 being jointed to a front area of a periphery of the communicating region 36 and a rear edge 60b region of the regulating tether 60 being jointed to a rear area of the periphery of the communicating region 36.

In the airbag device M of the illustrated embodiment, the inboard-side member or left panel 70 forming at least the inboard-side region or left wall 17a of the main bag section 17 is composed of the front component 71 which forms a front part of the inboard-side member and the rear component 80 which is provided separate from the front component 71 and forms a rear part of the inboard-side member. With this configuration, although being different from the configuration of the foregoing embodiment, it will be possible to provide a base material of the center bag section integrally in either the front component or rear component.

Alternatively, the airbag device M configured as described above may be configured such that:

the front component 71 includes the rear extended region 72 which protrudes rearward out of a region in a vicinity of the rear edge of the front component 71;

the rear component 80 includes the front extended region 85 which protrudes forward out of a region in a vicinity of the front edge of the rear component 80 and has a generally identical outer contour to the rear extended region 72 of the front component 71; and the center bag section 32 is formed by jointing the outer circumferential edges of the rear extended region 72 and the front extended region 85 together.

This configuration will facilitate the production of the center bag section 32 since the center bag section 32 can be formed by jointing the outer circumferential edges of the rear extended region 72 and the front extended region 85 together when forming the inboard-side or left wall region 18c of the main bag section 17. Further, this configuration provides, in the center bag section 32, the front wall region 33 and rear wall region 34 which are deployable to face each other in a front and rear direction, and the front wall region 33 and rear wall region 34 are each continuous with the inboard-side region (left wall region 18c) of the main bag section 17. This configuration will help generate a great tension force on the outer surfaces of the front wall region 33 and rear wall region 34 of the center bag section 32 when the center bag section 32 gains a high internal pressure due to an inflation gas upon airbag deployment. Therefore, in spite of its limited volume, the center bag section 32 will have a good shape retention property when inflated and deployed, thus will catch a passenger smoothly without being tumbled forward by the passenger.

The foregoing embodiments have been described assuming that the airbag device M for a front passenger seat is mounted on the vehicle V provided with a center seat CS disposed between the driver's seat DS and front passenger seat PS for protecting a center passenger P2 sitting in the center seat CS with the center bag section 32. However, the airbag device of the present invention can also be mounted on a vehicle having no center seat so as to be actuated in the event of an oblique or offset collision of the vehicle for protecting the driver or front seat passenger with the center bag section as he moves obliquely forward.

Moreover, the airbag device of the invention can also be configured to be mounted in front of the driver's seat (on a steering wheel, by way of example) of an automated-driving vehicle for protecting the driver. An airbag 104 for a steering wheel illustrated in FIG. 13 serves as a main bag section deployable in front of the driver's seat and a sub bag section 105 (indicated with a double-dotted line in FIG. 13) is formed to protrude out of a portion of a side of the main bag section 104. This airbag may also be internally provided with a regulating tether for regulating a clearance in a front and rear direction of a vicinity of a communicating region 36 between the sub bag section 105 and main bag section 104.

What is claimed is:

1. An airbag device for a front passenger seat adapted to be mounted on an instrument panel in front of a front passenger seat of a vehicle, the airbag device comprising a housing adapted to be disposed in the instrument panel and an airbag housed in the housing in a folded-up configuration, the airbag comprising:

a main bag section that is deployable in front of the front passenger seat and includes an inboard-side region deployable to face a vehicle interior and an inboard-side member that forms at least the inboard-side region;

a front component that forms a front part of the inboard-side region and includes a rear extended region which protrudes rearward out of a region in a vicinity of a rear edge of the front component;

a rear component that is provided separate from the front component and forms a rear part of the inboard-side region, the rear component including a front extended region which protrudes forward out of a region in a vicinity of a front edge of the rear component and has a generally identical outer contour to the rear extended region of the front component;

a center bag section that is disposed on the inboard-side region of the main bag section and deployable in such a manner as to protrude towards the vehicle interior out of a portion of the inboard-side region, the center bag section being formed by jointing outer circumferential edges of the rear extended region and front extended region, whereby the rear extended region forms a front wall region of the center bag section that is deployable to face a front of the vehicle while the front extended region forms a rear wall region of the center bag section that is deployable to face a rear of the vehicle.

2. The airbag device for a front passenger seat of claim 1, wherein:

the front component of the main bag section includes: a rear upper edge and a rear lower edge which extend generally along an up and down direction and form the rear edge of the front component above and underneath the rear extended region; and a rear upper curving region and a rear lower curving region which are disposed between the outer circumferential edge of the rear extended region and the rear upper edge and the rear lower edge and join the outer circumferential edge of the rear extended region with the rear upper edge and the rear lower edge gently in a curving fashion;

the rear component of the main bag section includes: a front upper edge and a front lower edge which are formed to correspond to the rear upper edge and the rear lower edge and form the front edge of the rear component above and underneath the front extended region; and a front upper curving region and a front lower curving region which are disposed between the outer circumferential edge of the front extended region and the front upper edge and the front lower edge and formed to correspond in curved shape to the rear upper curving region and rear lower curving region; and an area of the inboard-side region of the main bag section and the center bag section are formed by jointing together the rear upper edge and the front upper edge, the rear upper curving region and the front upper curving region, the outer circumferential edges of the rear extended region and the front extended region, the rear lower curving region and the front lower curving region, and the rear lower edge and the front lower edge.

3. The airbag device for a front passenger seat of claim 1, wherein the airbag further comprises:
- a mounting region that is disposed in the main bag section and by which the airbag is mounted on the housing; and
- a tether that joints a leading end of the center bag section as deployed and the mounting region inside the airbag for preventing an undue protrusion of the center bag section towards the vehicle interior.

4. The airbag device for a front passenger seat of claim 1, wherein the airbag further comprises a regulating tether that is disposed inside the airbag and regulates a clearance in a front and rear direction of a vicinity of a communicating region between the main bag section and center bag section.

5. An airbag device for a front passenger seat adapted to be mounted on an instrument panel in front of a front passenger seat of a vehicle, the airbag device comprising a housing adapted to be disposed in the instrument panel and an airbag housed in the housing in a folded-up configuration, the airbag comprising:
- a main bag section that is deployable in front of the front passenger seat and includes an inboard-side region deployable to face a vehicle interior;
- a center bag section that is disposed on the inboard-side region of the main bag section and deployable in such a manner as to protrude towards the vehicle interior out of a portion of the inboard-side region;
- a communicating region that provides gas communication between the main bag section and the center bag section; and
- a regulating tether that is disposed inside the airbag and regulates a clearance in a front and rear direction of a vicinity of the communicating region, a front edge region of the regulating tether being jointed to a front area of a periphery of the communicating region and a rear edge region of the regulating tether being jointed to a rear area of the periphery of the communicating region.

6. The airbag device for a front passenger seat of claim 5, wherein the airbag further comprises:
- an inboard-side member that forms at least the inboard-side region of the main bag section;
- a front component that forms a front part of the inboard-side region; and
- a rear component that is provided separate from the front component and forms a rear part of the inboard-side region.

7. The airbag device for a front passenger seat of claim 6, wherein:
- the front component includes a rear extended region that protrudes rearward out of a region in a vicinity of a rear edge of the front component;
- the rear component includes a front extended region that protrudes forward out of a region in a vicinity of a front edge of the rear component and has a generally identical outer contour to the rear extended region of the front component; and
- the center bag section is formed by jointing outer circumferential edges of the rear extended region and the front extended region together.

8. An airbag device for a driver's seat adapted to be mounted in front of a driver's seat of a vehicle, the airbag device comprising a housing adapted to be disposed in front of the driver's seat and an airbag housed in the housing in a folded-up configuration, the airbag comprising:
- a main bag section that is deployable in front of the driver's seat;
- a sub bag section that is deployable in such a manner as to protrude out of a portion of a side of the main bag section;
- a communicating region that provides gas communication between the main bag section and the sub bag section; and
- a regulating tether that is disposed inside the airbag and regulates a clearance in a front and rear direction of a vicinity of the communicating region.

* * * * *